(12) United States Patent
Gutman et al.

(10) Patent No.: US 12,244,390 B2
(45) Date of Patent: Mar. 4, 2025

(54) WAKE UP SIGNAL FOR BEAM TRACKING

(71) Applicant: QUALCOMM Incorporated, San Diego, CA (US)

(72) Inventors: Igor Gutman, Hod HaSharon (IL); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 18/159,405

(22) Filed: Jan. 25, 2023

(65) Prior Publication Data

US 2024/0250740 A1 Jul. 25, 2024

(51) Int. Cl.
*H03D 1/04* (2006.01)
*H04B 7/08* (2006.01)
*H04W 52/02* (2009.01)

(52) U.S. Cl.
CPC ........ *H04B 7/088* (2013.01); *H04W 52/0229* (2013.01)

(58) Field of Classification Search
CPC .......................... H04B 7/088; H04W 52/0229
USPC ................................ 375/346, 316, 219, 295
See application file for complete search history.

(56) References Cited

U.S. PATENT DOCUMENTS

| 2019/0082390 A1* | 3/2019 | Azizi | .................... H04L 5/0007 |
| 2020/0396685 A1* | 12/2020 | Nam | ....................... H04B 7/063 |
| 2022/0124622 A1* | 4/2022 | Islam | ................... H04W 72/542 |

* cited by examiner

*Primary Examiner* — Zewdu A Kassa
(74) *Attorney, Agent, or Firm* — Harrity & Harrity, LLP

(57) ABSTRACT

Various aspects of the present disclosure generally relate to wireless communication. In some aspects, a user equipment (UE) may receive, using at least one wake up receiver associated with the UE, one or more wake up signals for beam tracking (WUTs). The UE may measure a quality of each WUT, of the one or more WUTs. The UE may activate a main receiver associated with the UE to perform a beam recovery procedure based at least in part on a measured quality of at least one WUT, of the one or more WUTs. Numerous other aspects are described.

30 Claims, 15 Drawing Sheets

WAKE UP SIGNAL FOR BEAM TRACKING

FIELD OF THE DISCLOSURE

Aspects of the present disclosure generally relate to wireless communication and to techniques and apparatuses for wake up signal for beam tracking.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, using at least one wake up receiver (WUR) associated with the UE, one or more wake up signals for beam tracking (WUTs). The method may include measuring a quality of each WUT, of the one or more WUTs. The method may include activating a main receiver associated with the UE to perform a beam recovery procedure based at least in part on a measured quality of at least one WUT, of the one or more WUTs.

Some aspects described herein relate to a method of wireless communication performed by a network node. The method may include transmitting, to a UE, one or more WUTs. The method may include receiving, from the UE, a beam recovery request based at least in part on a measured quality of at least one WUT, of the one or more WUTs.

Some aspects described herein relate to a UE for wireless communication. The UE may include a memory and one or more processors coupled to the memory. The one or more processors may be configured to receive, using at least one WUR associated with the UE, one or more WUTs. The one or more processors may be configured to measure a quality of each WUT, of the one or more WUTs. The one or more processors may be configured to activate a main receiver associated with the UE to perform a beam recovery procedure based at least in part on a measured quality of at least one WUT, of the one or more WUTs.

Some aspects described herein relate to a network node for wireless communication. The network node may include a memory and one or more processors coupled to the memory. The one or more processors may be configured to transmit, to a UE, one or more WUTs. The one or more processors may be configured to receive, from the UE, a beam recovery request based at least in part on a measured quality of at least one WUT, of the one or more WUTs.

Some aspects described herein relate to a non-transitory computer-readable medium that stores a set of instructions for wireless communication by a UE. The set of instructions, when executed by one or more processors of the UE, may cause the UE to receive, using at least one WUR associated with the UE, one or more WUTs. The set of instructions, when executed by one or more processors of the UE, may cause the UE to measure a quality of each WUT, of the one or more WUTs. The set of instructions, when executed by one or more processors of the UE, may cause the UE to activate a main receiver associated with the UE to perform a beam recovery procedure based at least in part on a measured quality of at least one WUT, of the one or more WUTs.

Some aspects described herein relate to a non-transitory computer-readable medium that stores a set of instructions for wireless communication by a network node. The set of instructions, when executed by one or more processors of the network node, may cause the network node to transmit, to a UE, one or more WUTs. The set of instructions, when executed by one or more processors of the network node, may cause the network node to receive, from the UE, a beam recovery request based at least in part on a measured quality of at least one WUT, of the one or more WUTs.

Some aspects described herein relate to an apparatus for wireless communication. The apparatus may include means for receiving, using at least one WUR associated with the apparatus, one or more WUTs. The apparatus may include means for measuring a quality of each WUT, of the one or more WUTs. The apparatus may include means for activating a main receiver associated with the apparatus to perform a beam recovery procedure based at least in part on a measured quality of at least one WUT, of the one or more WUTs.

Some aspects described herein relate to an apparatus for wireless communication. The apparatus may include means for transmitting, to a UE, one or more WUTs. The apparatus may include means for receiving, from the UE, a beam recovery request based at least in part on a measured quality of at least one WUT, of the one or more WUTs.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
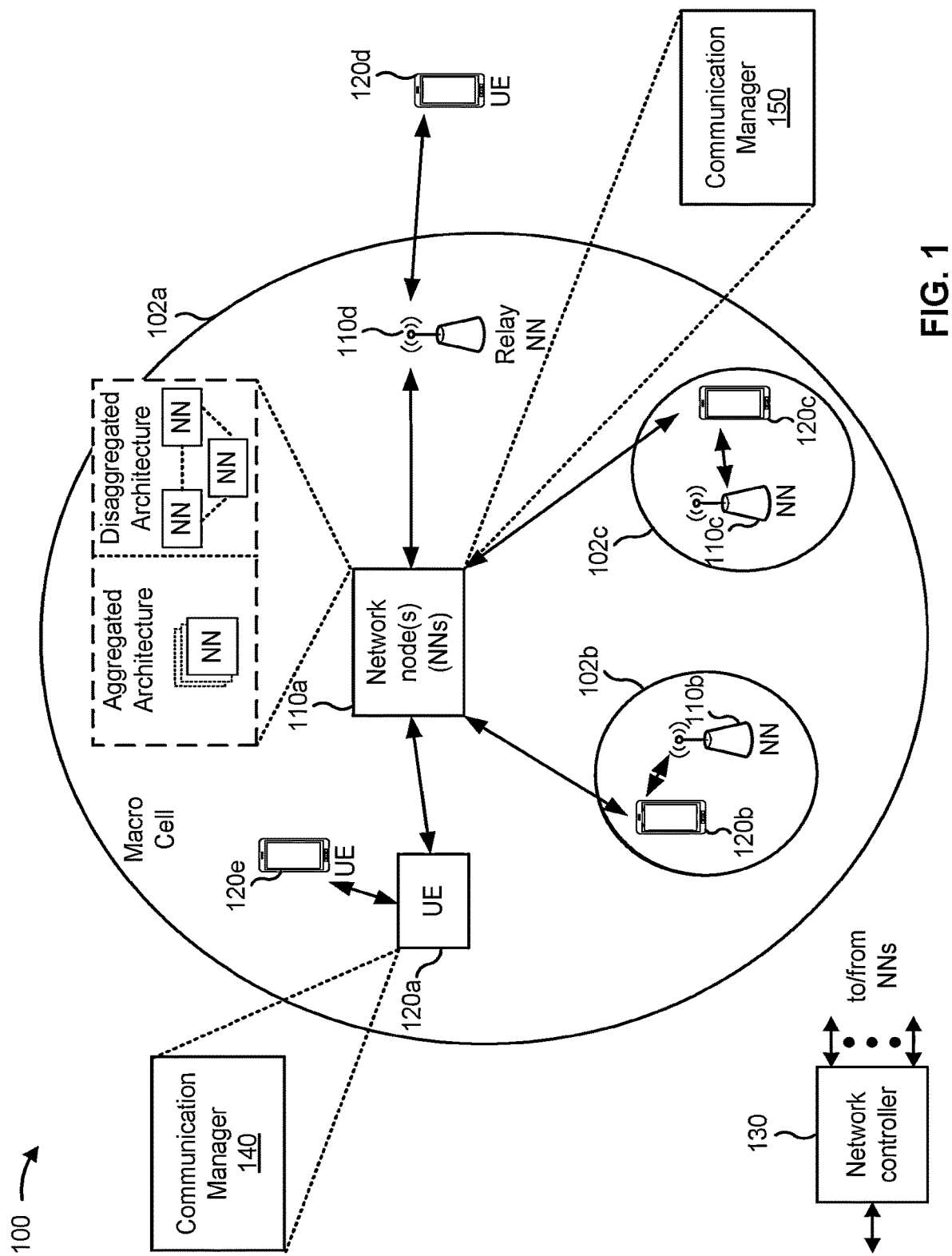
FIG. 1 is a diagram illustrating an example of a wireless network, in accordance with the present disclosure.

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In some examples, a network node may transmit, to a UE in a sleep mode (e.g., a discontinuous reception (DRX) mode), a wake up signal (WUS), which may be a signal that is searched for by a wake up receiver (WUR) at the UE, and which indicates to the UE that the network node has traffic to transmit to the UE. The WUR may be a relatively simple, low power (e.g., less than 1 mW) receiver configured to detect the WUS. In this way, the UE can search for and detect the WUS, and only then wake up a main baseband (BB) chip and/or radio associated with the UE, thereby reducing power consumption at the UE. More particularly, when the WUR detects the WUS, the WUR may trigger a main radio/BB, which thus wakes up and receives a transmission of main traffic (e.g., a downlink communication or similar communication) from the network node. Although utilizing the WUS and the WUR may beneficially reduce a power consumption at the UE, as compared to traditional DRX processes in which a main radio/BB may need to periodically wake up and search for a downlink signal, utilizing the WUS and the WUR may result in beams becoming misaligned at the network node and the UE, because the main radio and/or BB associated with the UE may remain asleep for extended periods of time and thus may not perform beam tracking procedures. This may result in degraded link quality and even radio link failure, and/or increased power, computing, and network resource consumption to correct communication errors caused by misaligned beams.

Some techniques and apparatuses described herein enable beam tracking using a WUS for beam tracking (WUT). In some aspects, a UE may wake up periodically (such as with a similar periodicity as used to transmit a synchronization signal block (SSB)) and perform beam quality measurements using a WUR based at least in part on a WUT. More particularly, the UE may periodically wake up a WUR, search for a WUT using one or more reception beams, and evaluate the quality of the WUT. If the quality of the WUT falls below a threshold, the UE may wake up a main BB chip and/or main radio to initiate a beam recovery procedure. In some aspects, the network node may need to transmit a WUT with multiple repetitions, thus using multiple time domain resources, in order to permit the UE to sweep a reception beam and/or in order to permit the network node to sweep a transmission configuration indicator (TCI) state. Accordingly, in some aspects, a UE may be associated with multiple parallel WURs, with each WUR being capable of receiving and analyzing a different beam and/or TCI state, which may reduce overhead associated with WUS and/or WUT transmissions and thus increase network capacity.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells.

In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, using at least one WUR associated with the UE, one or more WUTs; measure a quality of each WUT, of the one or more WUTs; and activate a main receiver associated with the UE to perform a beam recovery procedure based at least in part on a measured quality of at least one WUT, of the one or more WUTs. Additionally, or alternatively, the communication manager 140 may perform one or more other operations described herein.

In some aspects, the network node 110 may include a communication manager 150. As described in more detail elsewhere herein, the communication manager 150 may transmit, to a UE, one or more WUTs; and receive, from the UE, a beam recovery request based at least in part on a measured quality of at least one WUT, of the one or more WUTs. Additionally, or alternatively, the communication manager 150 may perform one or more other operations described herein.

As indicated above, FIG. 1 is provided as an example. Other examples may differ from what is described with regard to FIG. 1.

Figure 2:
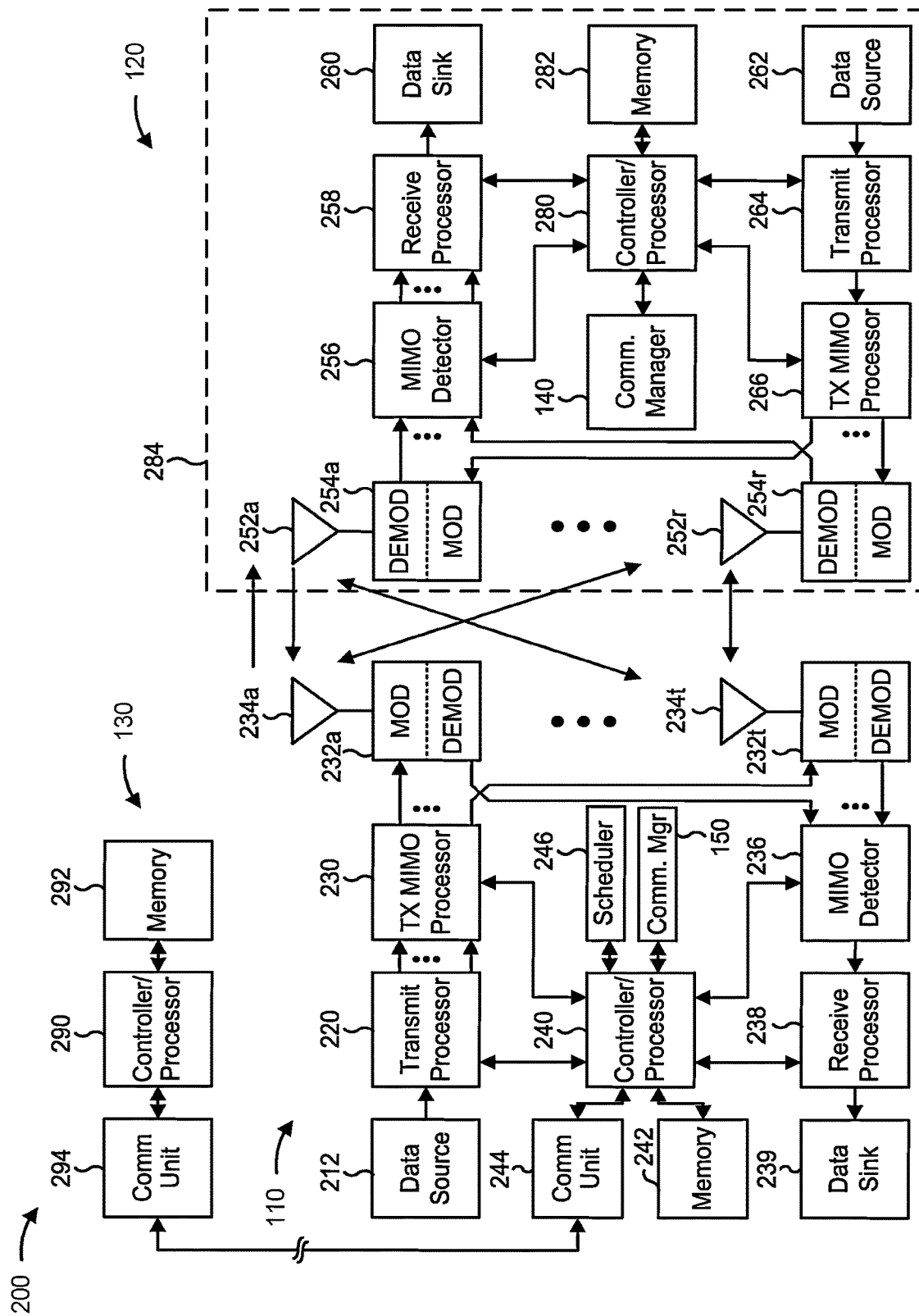
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-12).

The controller/processor 240 of the network node 110, the controller/processor 280 of the UE 120, and/or any other component(s) of FIG. 2 may perform one or more techniques associated with a WUT, as described in more detail elsewhere herein. For example, the controller/processor 240 of the network node 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE 120 includes means for receiving, using at least one WUR associated with the UE, one or more WUTs; means for measuring a quality of each WUT, of the one or more WUTs; and/or means for activating a main receiver associated with the UE 120 to perform a beam recovery procedure based at least in part on a measured quality of at least one WUT, of the one or more WUTs. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting, to a UE, one or more WUTs; and/or means for receiving, from the UE, a beam recovery request based at least in part on a measured quality of at least one WUT, of the one or more WUTs. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
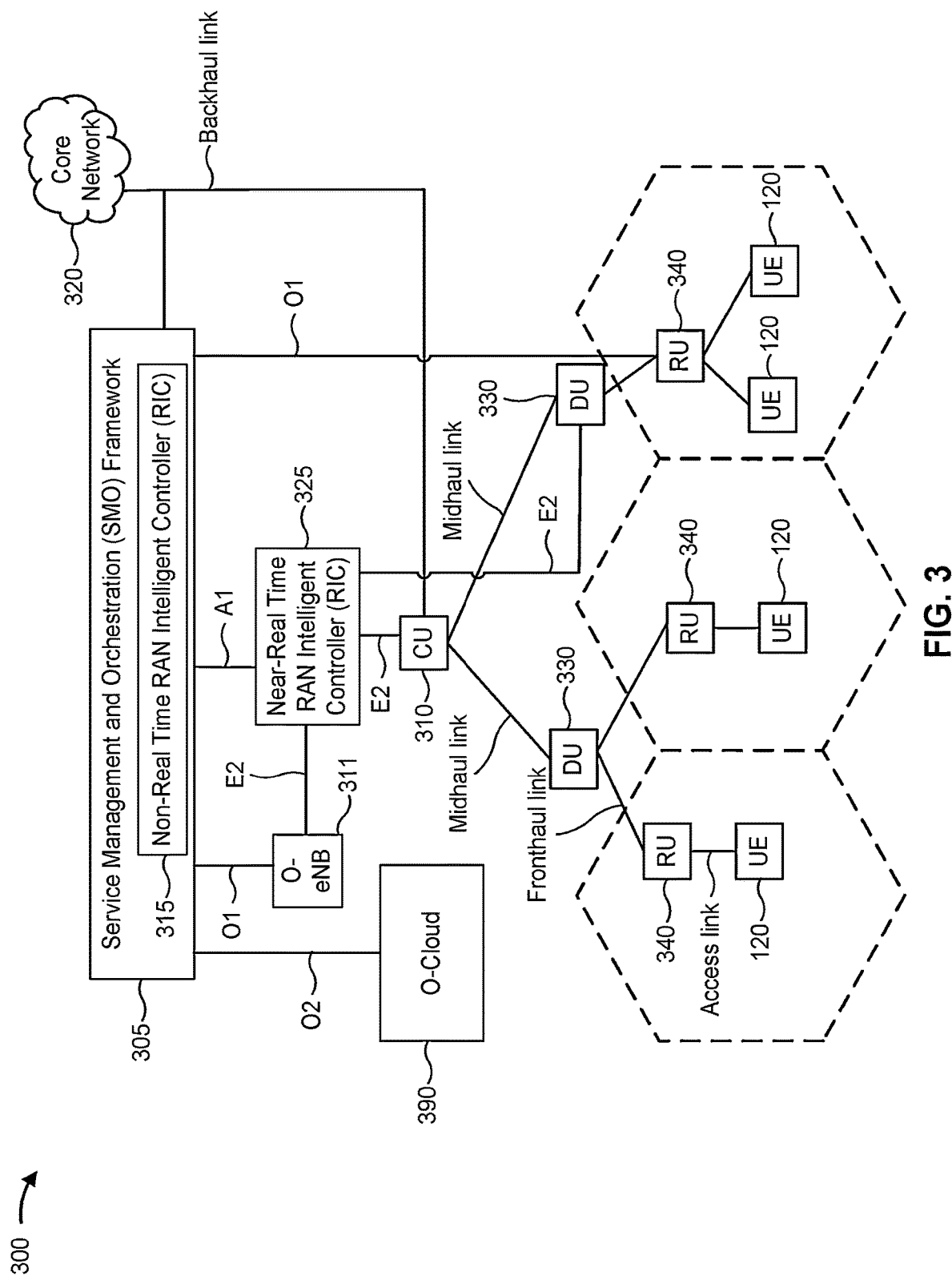
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4A:
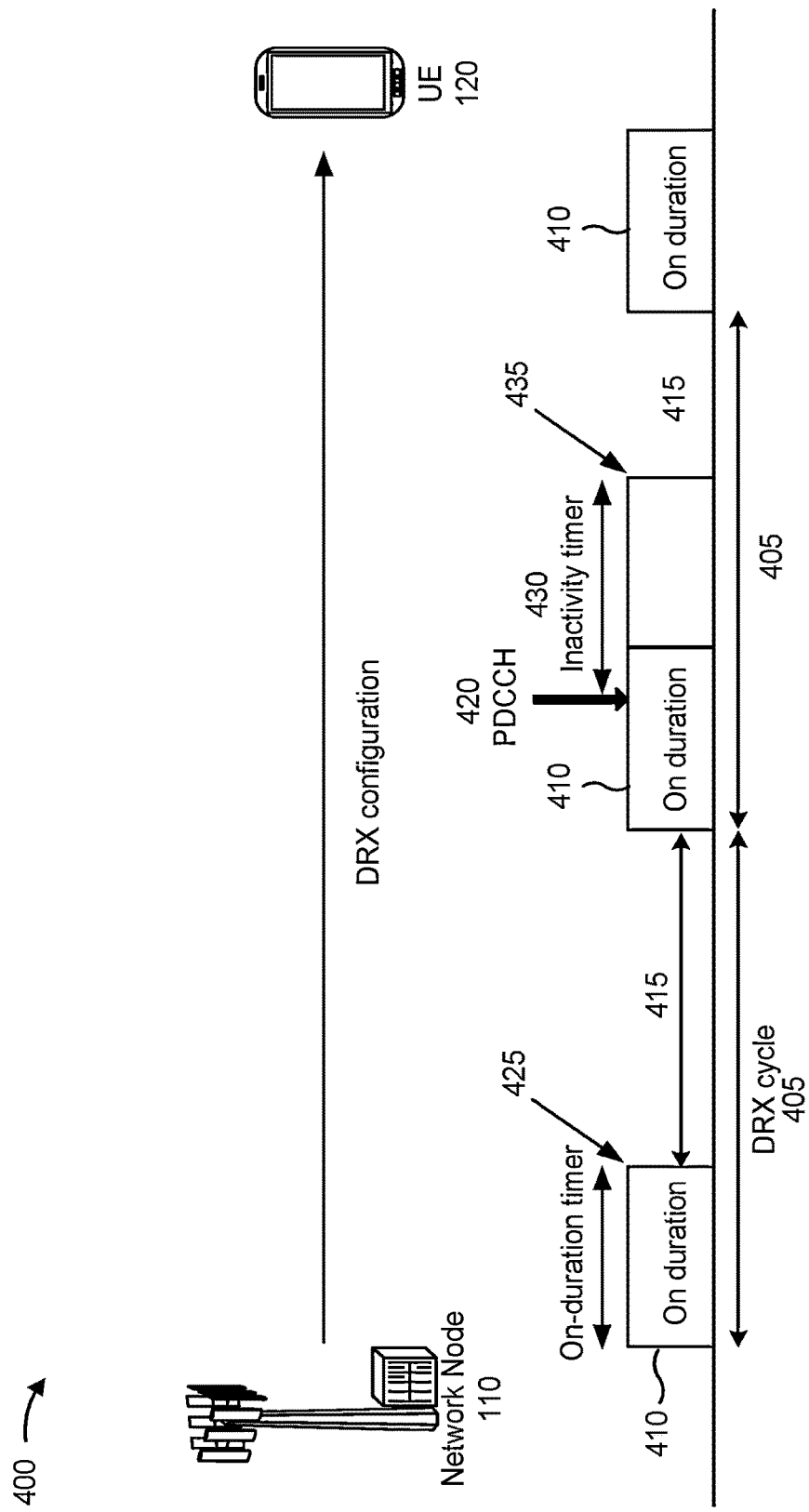
FIGS. 4A-4B are diagrams illustrating examples of discontinuous reception configurations, in accordance with the present disclosure.
Figure 4B:
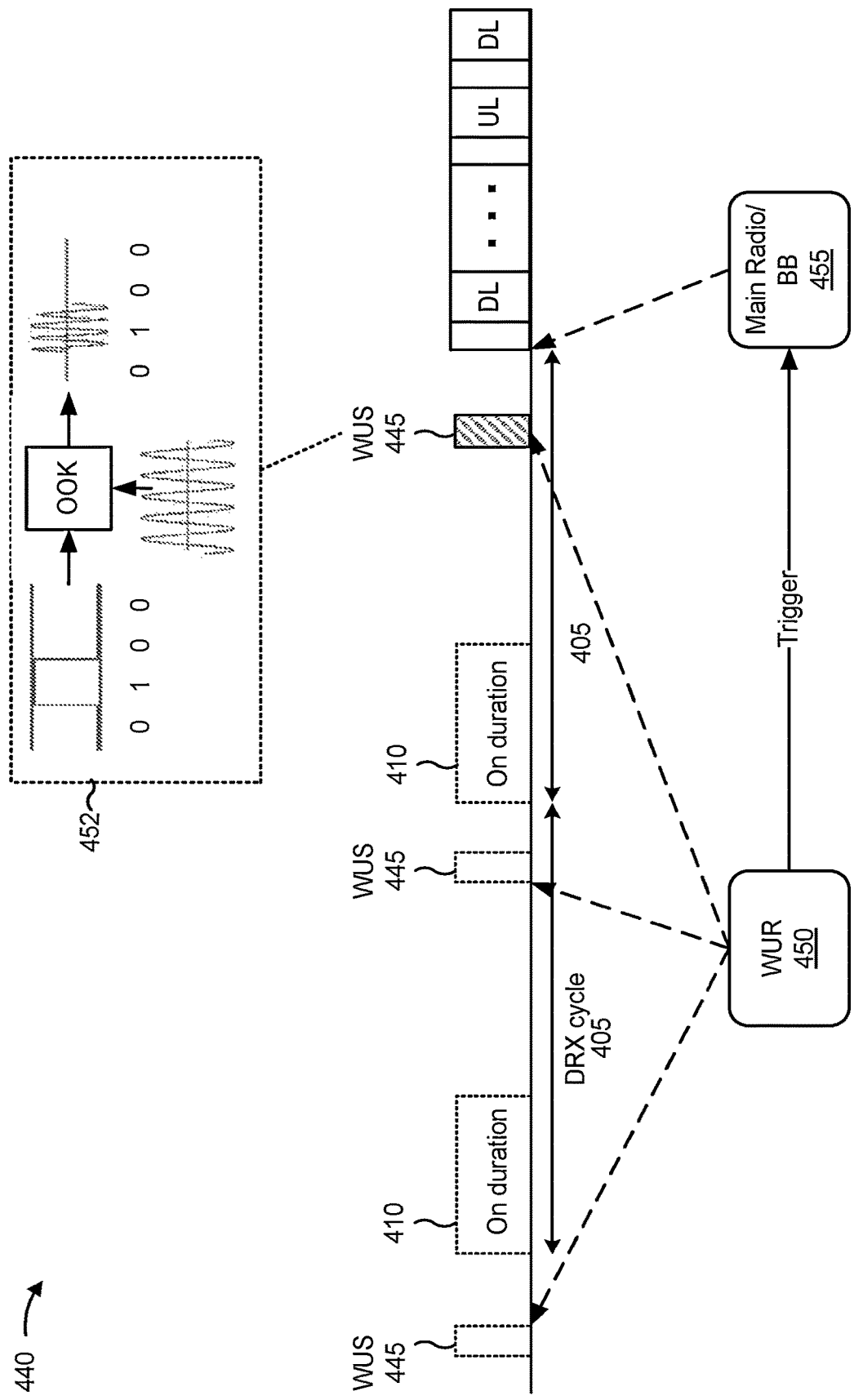

FIGS. 4A-4B are diagrams illustrating examples of DRX configurations, in accordance with the present disclosure.

As shown by example 400 in FIG. 4A, a network node 110 may transmit a DRX configuration to a UE 120 to configure a DRX cycle 405 for the UE 120. A DRX cycle 405 may include a DRX on duration 410 (e.g., during which a UE 120 is awake or in an active state) and an opportunity to enter a DRX sleep state 415. As used herein, the time during which the UE 120 is configured to be in an active state during the DRX on duration 410 may be referred to as an active time, and the time during which the UE 120 is configured to be in the DRX sleep state 415 may be referred to as an inactive time. As described below, the UE 120 may monitor a physical downlink control channel (PDCCH) during the active time, and may refrain from monitoring the PDCCH during the inactive time.

During the DRX on duration 410 (e.g., the active time), the UE 120 may monitor a downlink control channel (e.g., a PDCCH), as shown by reference number 420. For example, the UE 120 may monitor the PDCCH for downlink control information (DCI) pertaining to the UE 120. If the UE 120 does not detect and/or successfully decode any PDCCH communications intended for the UE 120 during the DRX on duration 410, then the UE 120 may enter the sleep state 415 (e.g., for the inactive time) at the end of the DRX on duration 410, as shown by reference number 425. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120, then the UE 120 may remain in an active state (e.g., awake) for the duration of a DRX inactivity timer 430 (e.g., which may extend the active time). The UE 120 may start the DRX inactivity timer 430 at a time at which the PDCCH communication is received (e.g., in a transmission time interval (TTI) in which the PDCCH communication is received, such as a slot or a subframe). The UE 120 may remain in the active state until the DRX inactivity timer 430 expires, at which time the UE 120 may enter the sleep state 415 (e.g., for the inactive time), as shown by reference number 435. During the duration of the DRX inactivity timer 430, the UE 120 may continue to monitor for PDCCH communications, may obtain a downlink data communication (e.g., on a downlink data channel, such as a physical downlink shared channel (PDSCH)) scheduled by the PDCCH communication, and/or may prepare and/or transmit an uplink communication (e.g., on a physical uplink shared channel (PUSCH)) scheduled by the PDCCH communication. The UE 120 may restart the DRX inactivity timer 430 after each detection of a PDCCH communication for the UE 120 for an initial transmission (e.g., but not for a retransmission). By operating in this manner, the UE 120 may conserve battery power and reduce power consumption by entering the sleep state 415. Nonetheless, the wakeup process (e.g., the process in which the UE 120 wakes up during the DRX on duration 410) may still require relatively high power consumption at the UE 120.

Accordingly, in some examples, such as example 440 shown in FIG. 4B, a WUS may be utilized by the network node 110 and/or the UE 120 in order to reduce a power consumption associated with a DRX process performed by the UE 120. In such examples, the network node 110 may periodically transmit a WUS 445, which may be a signal that is searched for by a low-power and/or relatively simple WUR 450 at the UE 120. In some examples, the WUS 445 may be a time domain signal associated with a non-space spectrum. Additionally, or alternatively, the WUS 445 may be associated with a single stage or at least two stages in the time domain without a requirement of complex decoding. As indicated by reference number 452, in some examples, the WUS 445 may be associated with a narrow band time domain sequence, such as on-off keying (OOK) based on a binary sequence. In such examples, the binary sequence may be associated with a similar distribution of "1" and "0" bits. A length of the sequence may be associated with a number of UEs 120 that a network node 110 may support and/or with a required processing gain. In some examples, a symbol length associated with the WUS 445 may be aligned with an NR numerology, such as by utilizing a single OFDM symbol for each bit. For example, for a 120 kilohertz (kHz) subcarrier spacing, a bit rate of the WUS 445 may be approximately 112 kilobits per second (kbps). In some examples, an amount of processing gain required may be associated with a number of bits in a sequence.

The WUR 450 may be a relatively simple, low power (e.g., less than 1 mW) receiver configured to detect the WUS 445. In this way, the UE 120 can search for and detect the WUS 445, and only then wake up a main BB chip and/or radio associated with the UE 120, thereby reducing power consumption at the UE 120. More particularly, when the WUR 450 detects the WUS 445, the WUR 450 may trigger a main radio/BB 455, which thus wakes up and receives a transmission of main traffic (e.g., a downlink communication or similar communication) from the network node 110. In such examples, the WUS 445 may be transmitted a sufficient period of time before the transmission of the main traffic, to permit the WUR 450 to trigger the main radio/BB 455 to receive the main traffic.

Although utilizing the WUS 445 and the WUR 450 may beneficially reduce a power consumption at the UE 120, as compared to the DRX process described above in connection with FIG. 4A, utilizing the WUS 445 may result in beams becoming misaligned at the network node 110 and the UE 120, because the main radio and/or BB associated with the UE 120 may remain asleep for extended periods of time and thus not perform beam tracking procedures. This may result in degraded link quality and even radio link failure, and/or increased power, computing, and network resource consumption to correct communication errors caused by misaligned beams.

Some techniques and apparatuses described herein enable beam tracking using a WUT. In some aspects, a UE 120 may wake up periodically (such as with a similar periodicity as used to transmit an SSB) and perform beam quality measurements using a WUR (e.g., WUR 450) based at least in part on a WUT. More particularly, the UE 120 may periodically wake up a WUR, search for a WUT using one or more reception beams, and evaluate the quality of the WUT. If the quality of the WUT falls below a threshold, the UE 120 may wake up a BB chip and/or main radio to initiate a beam recovery procedure. In some aspects, the network node 110 may need to transmit a WUS and/or a WUT with multiple repetitions (thus using multiple resources) in order to permit the UE 120 to sweep a reception beam and/or in order to permit the network node 110 to sweep a TCI state. Accordingly, in some aspects, a UE 120 may be associated with multiple parallel WURs, with each WUR being capable of receiving and analyzing a different beam and/or TCI state, which may reduce overhead associated with WUS and/or WUT transmissions and thus increase network capacity.

As indicated above, FIGS. 4A-4B are provided as examples. Other examples may differ from what is described with respect to FIGS. 4A-4B.

Figure 5:
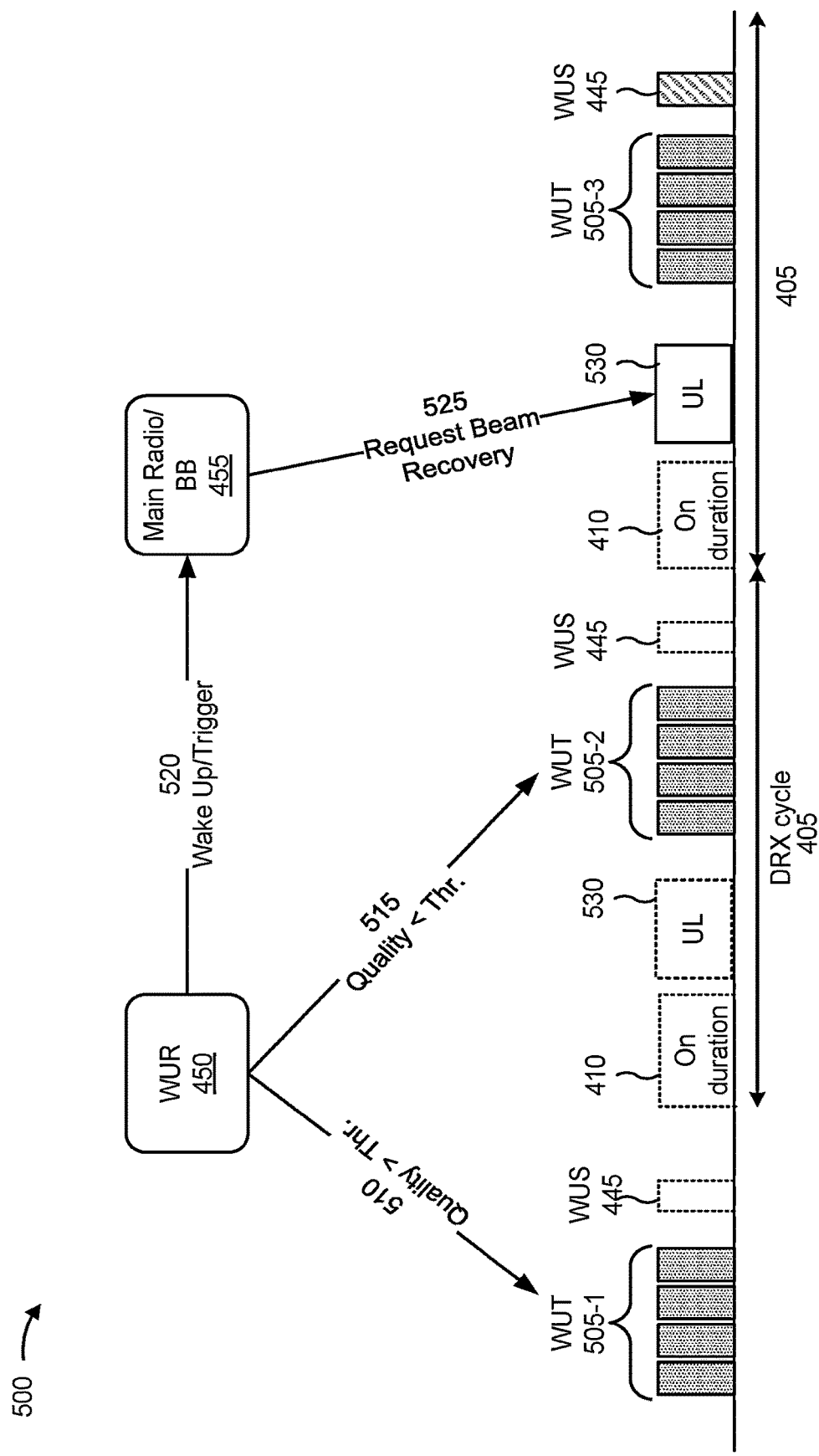
FIG. 5 is a diagram illustrating an example associated with a wake up signal for beam tracking (WUT), in accordance with the present disclosure.

FIG. 5 is a diagram illustrating an example 500 associated with a WUT, in accordance with the present disclosure. Example 500 may include communications between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

In some aspects, the UE 120 may be configured to operate in a DRX mode, as described above in detail in connection with FIG. 4A (such as by entering a sleep mode during the DRX cycle 405 and/or waking up during the DRX on duration 410 to search for a PDCCH or similar communication). Additionally, or alternatively, the UE 120 may be configured to receive the dedicated WUS 445, such by using the WUR 450, as described above in detail in connection with FIG. 4B.

In some aspects, the UE 120 may be configured to receive, using the WUR 450, one or more WUTs 505 (e.g., one or more repetitions of a WUT). The one or more WUTs 505 may be transmitted by a network node 110 with a configured periodicity. For example, the one or more WUTs 505 may be transmitted using a same periodicity as is used for transmitting an SSB. Accordingly, the UE 120 (more particularly, the WUR 450 associated with the UE 120) may be configured to wake up with the configured periodicity and receive the one or more WUTs 505. Moreover, the UE 120 (e.g., the WUR 450 associated with the UE 120) may be configured to periodically perform beam quality measurements using the one or more WUTs 505. In that way, the UE 120 may perform beam tracking while remaining in a sleep mode (e.g., a mode in which a main radio/BB 455 is in a sleep state), thereby reducing power consumption while maintaining a strong beam pair and thus a robust communication link with the network node 110.

In some aspects, the one or more WUTs 505 may be associated with an OOK signal, similar to the WUS 445 described above in connection with FIG. 4B. For example, the one or more WUTs 505 may be associated with an OOK signal having a different bit sequence than a bit sequence used for the WUS 445. More particularly, the WUS 445 may be associated with a bit sequence dedicated for use as a WUS, while the one or more WUTs 505 may be associated with a bit sequence dedicated for beam tracking. In some aspects, the one or more WUTs 505 may include multiple repetitions of the WUT signal. More particularly, the one or more WUTs 505 may be repeated in aspects in which the UE 120 is configured to track more than one beam. For example, in the example 500 shown in FIG. 5, the one or more WUTs 505 may include four repetitions of a WUT, used by the UE 120 to track up to four beams.

In some aspects, a network node 110 may configure the UE 120 with certain parameters associated with the one or more WUTs 505 and/or the WUS 445, and/or the network node 110 may otherwise signal certain information related to the one or more WUTs 505 and/or the WUS 445. For example, the network node 110 may signal WUT and/or WUS resource information to the UE 120, such as when the UE 120 is in a connected state with the network node 110, prior to the UE 120 entering a sleep mode and/or a DRX cycle 405. For example, the network node 110 may signal to the UE 120 information such as resources associated with the one or more WUTs 505 and/or the WUS 445, a sequence of the one or more WUTs 505 and/or the WUS 445, a periodicity of the one or more WUTs 505 and/or the WUS 445, offsets associated with the one or more WUTs 505 and/or the WUS 445, a number of occasions and/or repetitions associated with the one or more WUTs 505 and/or the WUS 445, or similar information.

Based at least in part on the information signaled to the UE 120 by the network node 110, the UE 120 may periodically wake up (e.g., may periodically wake up the WUR 450 associated with the UE 120), search for the one or more WUTs 505 on one more reception beams, and evaluate the qualities of the one or more WUTs 505. More particularly, the WUR 450 associated with the UE 120 may wake up and search for a first instance of the one or more WUTs 505 (shown as WUT 505-1), a second instance of the one or more WUTs 505 (shown as WUT 505-2), a third instance of the one or more WUTs 505 (shown as WUT 505-3), and so forth, according to a configured periodicity of the one or more WUTs 505.

In some aspects, if a quality of the one or more WUTs 505 is not above a preconfigured threshold, the UE 120 may wake up the main radio/BB 455, notify the network node 110 that the quality has fallen below the threshold, and/or initiate an active beam search and/or recovery procedure. More particularly, as shown by reference number 510, in some aspects, a measured quality of the one or more WUTs 505 (e.g., WUT 505-1) may be above a certain threshold, and thus the UE 120 may not wake up the main radio/BB 455 or otherwise trigger a beam recovery procedure. In some aspects, the threshold may be associated with a counter, such that each time a quality threshold is crossed (e.g., each time a beam quality falls below the threshold), the counter is incremented. In such aspects, if the counter has not reached a target, the UE 120 may not wake up the main radio/BB 455 or otherwise trigger a beam recovery procedure. However, as shown by reference number 515, in some aspects, a measured quality of the one or more WUTs (e.g., WUT 505-2) may fall below the threshold (or, in aspects involving a counter, the counter may reach the target). In such aspects, as shown by reference number 520, the WUR 450 may wake up and/or trigger the main radio/BB 455, such that the main radio/BB 455 may perform a beam recovery procedure.

More particularly, the UE 120 (e.g., the main radio/BB 455 of the UE 120) may transmit a beam recovery request 525 in dedicated uplink resources 530. The network node 110 may configure the UE 120 with the uplink resources 530, and thus periodically search for the beam recovery request 525 in the uplink resources 530. In aspects in which the UE 120 does not need to perform a beam recovery procedure (e.g., aspects in which the quality of the one or more WUTs exceeds the threshold), the UE 120 may not wake up the main radio/BB 455 and thus may not transmit the beam recovery request in the uplink resources 530. Thus, the network node 110 may not initiate the beam recovery procedure and the UE 120 may remain in the sleep mode, conserving power resources. However, in aspects in which the UE 120 needs to perform a beam recovery procedure (e.g., aspects in which the quality of the one or more WUTs falls below the threshold), the UE 120 may wake up the main radio/BB 455 and thus transmit the beam recovery request in the uplink resources 530. Thus, the network node 110 may receive the beam recovery request and initiate the beam recovery procedure, accordingly, resulting in a more robust link and/or beam pair being maintained, even when a UE 120 is operating in a DRX mode.

In some aspects, the UE 120 may be configured to perform cross-carrier beam tracking, such as when the UE 120 and/or the network node 110 are operating in a dual connectivity (DC) and/or carrier aggregation (CA) mode. For example, the UE 120 and/or the network node 110 may be communicating in an FR1 and FR2 CA mode, an FR1 and FR2 DC mode, or a similar CA and/or DC mode. In such aspects, the WUS 445 may be transmitted and received using a first component carrier (CC), and the one or more WUTs 505 may be transmitted and/or received using a second CC different from the first CC. For example, the WUS 445 may be transmitted and/or received using FR1, and the one or more WUTs may be transmitted and/or received using FR2. In some aspects, the first CC may be one of FR1, FR2, or another band, and the second CC may be a different one of FR1, FR2, or another band. In some aspects, the one or more WUTs 505 may be periodically transmitted in the second CC while the WUS 445 is transmitted and/or received when needed in the first CC. Additionally, or alternatively, in some aspects, a WUS 445 transmitted and/or received in the first CC may trigger the one or more WUTs in the second CC (e.g., an indication of resources associated with the one or more WUTs 505, repetitions associated with the one or more WUTs 505, a sequence associated with the one or more WUTs), or similar information may be carried in the WUS 445 or other control channel in the first CC. In some other aspects, regular layer 1 (L1) signaling (e.g., DCI) or layer 2 (L2) signaling (e.g., a MAC control element (MAC-CE)) in the first CC may trigger the one or more WUTs 505 in the second CC. Additional aspects regarding signaling, transmission, and/or reception of one or more WUTs 505 are described in more detail below in connection with FIG. 6.

As indicated above, FIG. 5 is provided as an example. Other examples may differ from what is described with respect to FIG. 5.

Figure 6:
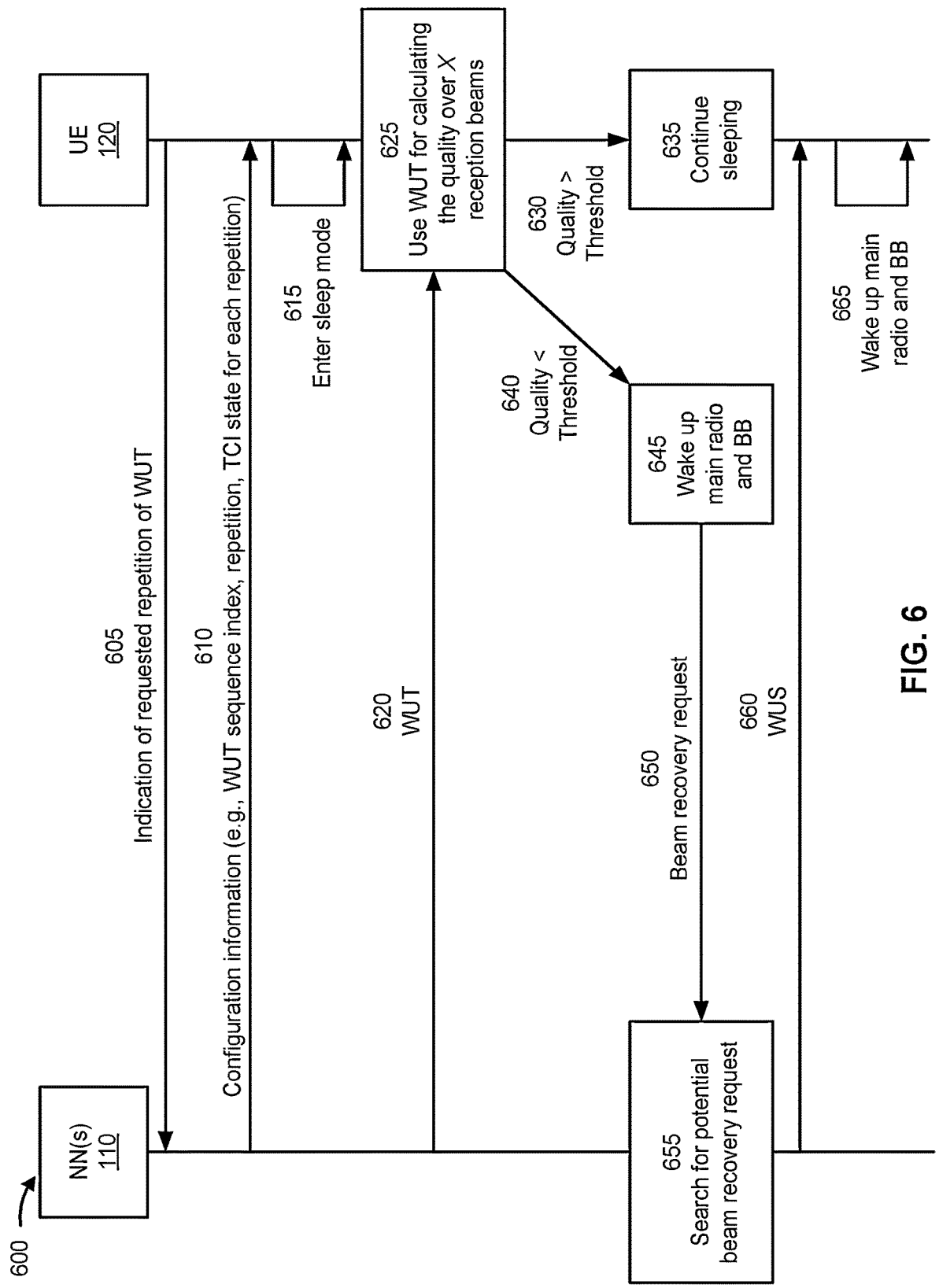
FIG. 6 is a diagram of another example associated with a WUT, in accordance with the present disclosure.

FIG. 6 is a diagram of another example 600 associated with a WUT, in accordance with the present disclosure. As shown in FIG. 6, a network node 110 (e.g., a CU, a DU, and/or an RU) may communicate with a UE 120. In some aspects, the network node 110 and the UE 120 may be part of a wireless network (e.g., wireless network 100). The UE 120 and the network node 110 may have established a wireless connection prior to operations shown in FIG. 6. In some aspects, the network node 110 and the UE 120 may be configured to communicate using a WUS (e.g., the WUS 445) and/or one or more WUTs (e.g., the one or more WUTs 505).

As shown by reference number 605, the UE 120 may transmit, and the network node 110 may receive, an indication of a requested number of WUT repetitions to be received by the UE 120. For example, in some aspects, the UE 120 may transmit, and the network node 110 may receive, a capabilities report indicating the requested number of WUT repetitions to be received by the UE 120, such as by indicating a number of WUT repetitions that the UE 120 is capable of measuring and/or a number of beams the UE 120 is capable of tracking. In some aspects, the indication of the requested number of WUT repetitions may be transmitted using one of L2 signaling (e.g., a MAC-CE) or layer 3 (L3) signaling (e.g., RRC signaling). In some aspects, the indication of the requested number of WUT repetitions to be received by the UE 120 may be transmitted by the UE 120 and received by the network node 110 while the UE 120 and the network node 110 are in a connected mode (e.g., prior to the UE 120 entering a sleep mode and/or a DRX mode). For example, while still in a connected mode, the UE 120 may ask the network node 110 (e.g., using L2 and/or L3 signaling) for a specific repetition of the next WUT transmission, which may be subject to UE 120 capabilities, such as a number of reception beams at the UE 120.

As shown by reference number 610, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples. In some aspects, the configuration information may be transmitted by the network node 110, and received by the UE 120, prior to the UE entering a sleep mode (e.g., the configuration information may be transmitted while the network node 110 and the UE 120 are in a connected mode).

In some aspects, the configuration information may indicate information associated with receiving the one or more WUTs. For example, the information associated with receiving the one or more WUTs may include at least one of resources associated with the one or more WUTs, a sequence index associated with the one or more WUTs, a period associated with the one or more WUTs, an offset associated with the one or more WUTs, a number of occasions associated with the one or more WUTs, a TCI state associated with the one or more WUTs, or a bandwidth associated with the one or more WUTs. In some aspects, a TCI state associated with the one or more WUTs may be used by the UE 120 for purposes of beam tracking and/or fast TCI adaptation after wakeup (e.g., after the UE 120 detects a WUS), and/or a reception beam associated with the UE 120 may be swept for in order to perform a reception beam switch immediately following a WUS detection (e.g., for the main BB and/or radio to implement a best reception beam that was measured during a sleep mode using the WUTs).

In some aspects, the configuration information may include an indication of an action to take at the UE 120 that is based at least in part on measuring the quality of each WUT, of the one or more WUTs. For example, in some aspects, the network node 110 may indicate to the UE 120 that the UE 120 is to track the one or more WUTs for purposes of following the best reception beam/TCI state and/or to apply the best reception beam when a WUR associated with the UE 120 (e.g., WUR 450) detects a WUS and thus the UE 120 wakes up. In some other aspects, the network node 110 may indicate to the UE 120 that the UE 120 is to track the one or more WUTs and, if a quality of the one or more beams falls below a threshold (e.g., if a measured quality of the one or more WUTs falls below a threshold and/or if a counter associated with the measured quality of the one or more WUTs satisfies a quantity threshold), then the UE 120 is to wake up and initiate a beam recovery procedure by signaling on a dedicated uplink allocation, in a similar manner as described above in connection with the beam recovery request 525, and as is discussed in more detail below in connection with reference numbers 645-655.

The UE 120 may configure itself based at least in part on the configuration information. In some aspects, the UE 120 may be configured to perform one or more operations described herein based at least in part on the configuration information.

As shown by reference number 615, the UE 120 may enter a sleep mode. For example, the UE 120 may enter a DRX mode, as described above in connection with FIGS. 4A and 4B. In some aspects, while in the sleep mode, the UE 120 may periodically wake up and/or operate a WUR (e.g., WUR 450) to search for a WUS (e.g., WUS 445) and/or one or more WUTs (e.g., one or more WUTs 505), but may otherwise keep other components, such as a main BB chip and/or one or more main radios, in a powered-down state in order to reduce power consumption associated with the UE 120.

As shown by reference number 620, the network node 110 may transmit, and the UE 120 may receive (e.g., using at least one WUR associated with the UE), one or more WUTs. In some aspects, the network node 110 may transmit the one or more WUTs with a configured repetition (e.g., such as the four repetitions of the one or more WUTs 505 described above in connection with FIG. 5), and/or the network node 110 may switch between TCI states among the one or more WUTs (e.g., at least a first WUT repetition may be associated with a first TCI state while at least a second WUT may be associated with a second TCI state different from the first TCI state). In some aspects, the WUTs may be associated with multiple repetitions, and the UE 120 may perform beam sweeping when receiving the multiple repetitions, such as for purposes of tracking a best TCI state and/or a best reception beam, which is described in more detail below in connection with reference number 625.

In some aspects, the one or more WUTs are associated with an OOK signal, as described above in connection with FIG. 5. For example, the one more WUTs may be associated with a first OOK signal, and a WUS transmitted by the network node 110 and received by the UE 120 (described in more detail below in connection with reference number 660) may be associated with a second OOK signal. In such aspects, a first bit sequence associated with the first OOK signal may be different than a second bit sequence associated with the second OOK signal. In such aspects, the UE 120 may use a same WUR that is used to receive a WUS to also receive the one or more WUTs, but the UE 120 may reconfigure the WUR with a dedicated bit sequence for each of the WUT occasions, while sweeping multiple reception beams.

As shown by reference number 625, the UE 120 may use the one or more WUTs for calculating a quality over a number (sometimes referred to herein as X) of reception beams. More particularly, the network node 110 may periodically transmit the one or more WUTs, and the UE 120 may measure a quality of each WUT, of the one or more WUTs, such as by performing a correlation procedure to estimate the quality of a beam associated with each WUT repetition. In some aspects, the UE 120 may use a quality indicator (such as a correlation value associated with receiving a corresponding WUT, or a similar indicator) in order to track a beam quality. Additionally, or alternatively, the UE 120 may perform a beam sweeping procedure when receiving the one or more WUTs. For example, in aspects in which the one or more WUTs are associated with multiple beams, the UE 120 may receive an indication of a TCI state associated with each beam, of the multiple beams (e.g., via the configuration information described above in connection with reference number 610). In such aspects, measuring the quality of each WUT may be associated with sweeping a reception beam associated with the UE 120 (e.g., when a same TCI state is associated with two or more beams), and/or maintaining a constant reception beam associated with the UE 120 (e.g., when different TCI states are associated with two or more beams).

In some aspects, the UE 120 may wake up a main radio/BB (e.g., main radio/BB 455) when a quality indicator over time indicates a need to begin beam recovery (such as in cases in which the configuration information described in connection with reference number 610 indicates that the UE 120 is to track the one or more WUTs, and, if a quality of the one or more beams is reduced below a threshold, then the UE 120 is to wake up and initiate a beam recovery procedure by signaling on a dedicated uplink allocation). More particularly, as shown by reference number 630, in some aspects, a quality of the one or more WUTs may remain above a threshold. For example, in aspects in which a counter is employed at the UE 120, the measured quality of the one or more WUTs may not yet have reached a target (e.g., a threshold quantity). Accordingly, as shown by reference number 635, the UE 120 may continue sleeping. Put another way, the UE 120 may not wake up a main radio/BB to initiate a beam recovery procedure because a measured quality of the one or more WUTs may not yet have deteriorated to a level requiring beam recovery.

However, as shown by reference number 640, in some other aspects, the measured quality of the one or more WUTs may fail to satisfy a quality threshold, and thus, as shown by reference number 645, the UE 120 may activate a main receiver (e.g., a main radio and/or a BB chip) associated with the UE 120 to perform a beam recovery procedure based at least in part on a measured quality of at least one WUT, of the one or more WUTs. In some aspects, activating the main receiver to perform the beam recovery procedure may be based at least in part on the measured quality of the at least one WUT failing to satisfy a threshold (sometimes referred to herein as a quality threshold). In some other aspects, activating the main receiver to perform the beam recovery procedure may be based at least in part on the measured quality of the at least one WUT failing to satisfy a quality threshold a configured quantity of times (e.g., may be based at least in part on the failure counter reaching a target value). Put another way, the UE 120 may wake up the main receiver and/or initiate a beam recovery process in instances in which the quality indicator (over time) indicates the need to begin beam recovery. In some aspects, the counter may be initiated upon wake up of the UE 120 and/or based at least in part on conditions configured by the network node 110. For example, the network node 110 may indicate to the UE 120 a predefined time period in which the counter is static, and thus the UE 120 may initiate the counter upon expiration of the predefined time period.

As shown by reference number 650, after waking up the main radio, main BB, or similar components, the UE 120 may initiate a beam recovery procedure, such as by transmitting, to the network node 110, a beam recovery request. In such aspects, as shown by reference number 655, the network node 110 may search for a potential beam recovery request in a dedicated uplink resource, such as the dedicated uplink resource 530 described above in connection with FIG. 5. For example, the UE 120 may transmit an uplink signal (e.g., using a dedicated uplink resource 530), with an indication that a beam recovery is needed, such as in cases when the network node 110 configured the UE 120 to track the one or more WUTs, and, if a quality of the one or more beams is reduced below a quality threshold, wake up and initiate a beam recovery procedure by signaling on a dedicated uplink allocation. In some aspects, the UE 120 may initiate a beam recovery request for all WUT repetitions of that are relevant to a previous configured TCI state.

In some aspects, as shown by reference number 660, the network node 110 may transmit, and the UE 120 may receive, a WUS (e.g., WUS 445). In such aspects, the WUS may be received using the same WUR used to receive the one or more WUTs, with the WUR reconfigured according to a specific bit sequence used for purposes of the WUS, as described above in connection with reference number 620. In some aspects, such as aspects in which the network node 110 and the UE 120 are operating in a CA mode and/or a DC mode, the WUS and the one or more WUTs may be received in different CCs, as described above in connection with FIG. 5. For example, the WUS may be transmitted by the network node 110, and received by the UE 120, in a first CC, and the one or more WUTs may be transmitted by the network node 110, and received by the UE 120, in a second CC different from the first CC. For example, the WUS may be transmitted in a first CC (e.g., FR1 or another CC), and the one or more WUTs may be periodically transmitted in the second CC (e.g., FR2 or another CC). In some other aspects, the WUS may include an indication triggering the UE 120 to receive the one or more WUTs (e.g., the WUS may indicate resources associated with the one or more WUTs, repetitions associated with the one or more WUTs, sequence information associated with the one or more WUTs, or similar information). In some other aspects, regular L1 and/or L2 signaling in one CC may trigger the one or more WUTs in another CC. For example, the network node 110 may transmit, and the UE 120 may receive, a DCI and/or a MAC-CE including an indication triggering the UE 120 to receive the one or more WUTs.

In some aspects, the WUS and the one or more WUTs may be combined as a single reference signal. Put another way, the network node 110 may transmit, and the UE 120 may receive (e.g., using the WUR), the WUS and the one or more WUTs, with the one or more WUTs and the WUS being associated with a same reference signal. In such aspects, the UE 120 may process the reference signal containing both the WUS and the one or more WUTs using parallel correlators. More particularly, the UE 120 may search for (e.g., using the WUR) the WUS or the one or more WUTs, by performing two parallel correlators, each with its own predefined sequence. Additionally, or alternatively, in aspects in which the WUS and the one or more WUTs may be combined in a single reference signal, the network node 110 may transmit a WUS (which would then initiate UE 120 to wake up, as described in more detail below in connection with reference number 665), and then the one or more WUTs may be processed for fast beam tracking, or else the network node 110 may transmit only the one or more WUTs, and thus the UE 120 perform only periodical beam tracking while continuing to sleep (e.g., maintaining the main radio and/or BB in a powered-down mode).

As shown by reference number 665, in some aspects, the UE 120, based at least in part on receiving the WUS, may activate the main receiver associated with the UE 120 to receive a downlink communication (e.g., to receive normal traffic from the network node 110). In some aspects, the UE 120 may use information associated with tracking the one or more WUTs for purposes of establishing a connection with the network node 110 upon waking up to receive the downlink communication. For example, a reception beam used to receive the downlink communication may be associated with a WUT, of the one or more WUTs, associated with a highest quality. More particularly, in some aspects, upon discovering the WUS, the UE 120 may initiate a wake up procedure (e.g., trigger the main BB and/or main radio to return to a powered-on state), and may use a best reception beam coupled to a last configured TCI state that was tracked during the sleep mode by the WUR (e.g., that was tracked based on the repeated WUT and configured reception beams). Additionally, or alternatively, the UE 120 may transmit, and the network node 110 may receive, an indication of an index associated with the WUT associated with the highest quality, such as for purposes of facilitating the network node 110 to switch to an optimal TCI state after the UE 120 wakes up. For example, the UE 120 may signal (e.g., using L1 and/or L2 signaling) to the network node 110 an index of the WUT repetition on which the best beam was tracked, which may enable the network node 110 to perform a quick switch to an optimal TCI state after the wakeup.

Based at least in part on the network node 110 and the UE 120 implementing beam tracking using a WUT, the UE 120 and/or the network node 110 may conserve computing, power, network, and/or communication resources that may have otherwise been consumed traditional DRX processes. For example, based at least in part on the network node 110 and the UE 120 implementing beam tracking using a WUT, the UE 120 and the network node 110 may maintain a more robust communication link while the UE 120 is in a sleep mode and thereby communicate with a reduced error rate, which may conserve computing, power, network, and/or communication resources that may have otherwise been consumed to detect and/or correct communication errors.

As described above in connection with reference number 620, the network node 110 may need to transmit a WUT with multiple repetitions (thus using multiple resources) in order to permit the UE 120 to sweep a reception beam and/or in order to permit the network node 110 to sweep a TCI state. In some aspects, a UE 120 may be associated with multiple parallel WURs, with each WUR being capable of receiving and analyzing a different beam and/or TCI state. Utilizing multiple parallel WURs may reduce overhead associated with WUS and/or WUT transmissions and thus increase network capacity. Aspects of a UE 120 employing multiple parallel WURs are described in more detail below in connection with FIGS. 7-8B.

As indicated above, FIG. 6 is provided as an example. Other examples may differ from what is described with respect to FIG. 6.

Figure 7:
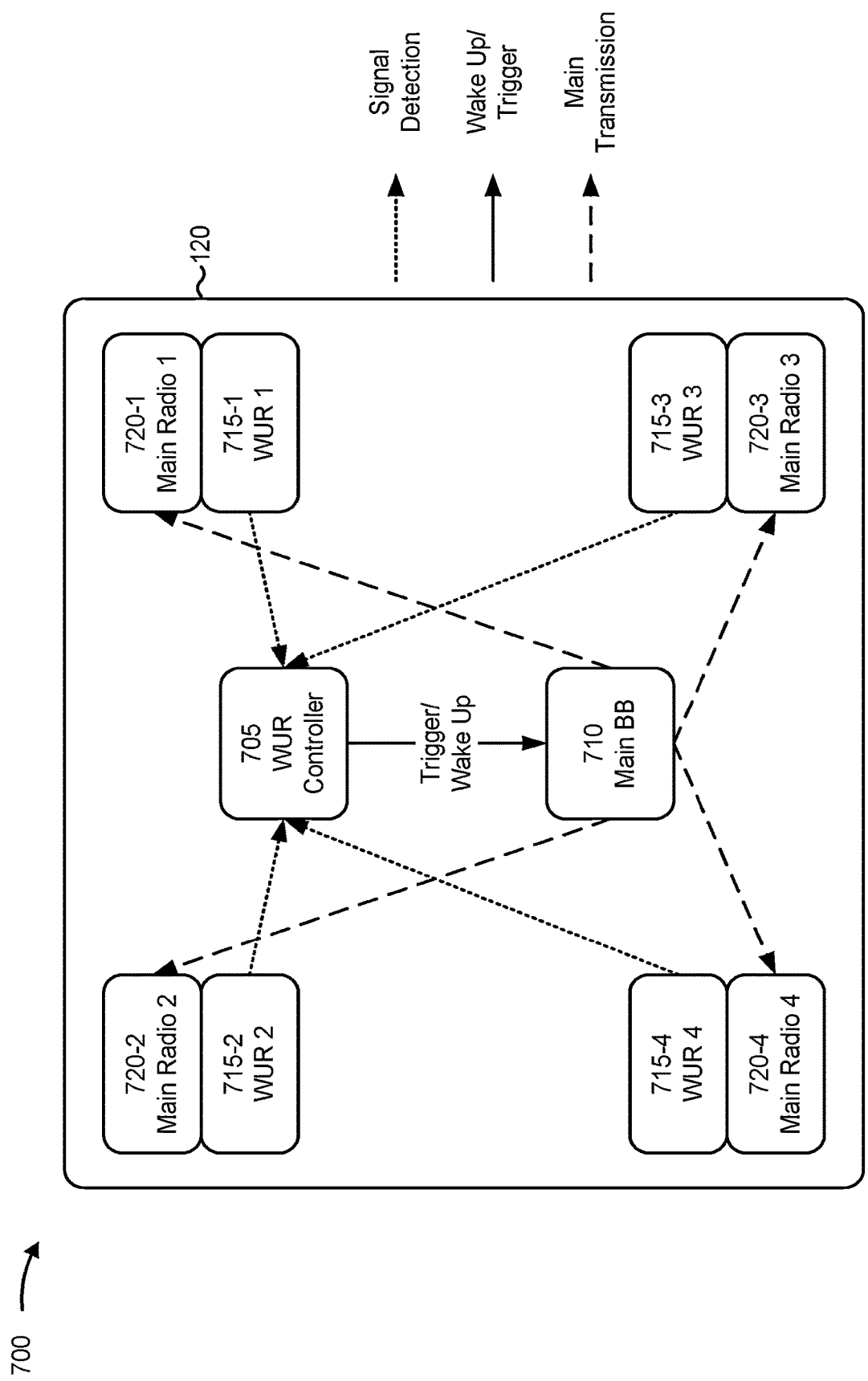
FIG. 7 is a diagram illustrating an example associated with parallel wake up receiver (WUR) reception, in accordance with the present disclosure.

FIG. 7 is a diagram illustrating an example 700 associated with parallel WUR reception, in accordance with the present disclosure. The example 700 may be associated with a communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. The network node 110 and the UE 120 may be configured to communicate using WUSs and/or WUTs, such as the WUSs and/or WUTs described above in connection with FIGS. 4B-6.

As described above in connection with reference number 620, the network node 110 may periodically transmit WUT repetitions such that the UE 120 may periodically wake up a WUR, search for the WUT repetitions using one or more reception beams, and evaluate the quality of the WUT repetitions. In some aspects, this may require high overhead and/or resource consumption, because the network node 110 may need to assign a number (sometimes referred to herein as N) of repeated time resources associated with the WUT, during which the UE 120 may sweep the reception beam and/or during which the network node 110 may sweep the TCI state. This multiple allocation of repeated resources may cost network capacity.

As shown in FIG. 7, in some aspects, a UE 120 may include certain hardware enhancements to enable parallel reception of a WUT, thereby reducing a number of repeated resources associated with a WUT transmission and thereby increasing network capacity. More particularly, the UE 120 may be associated with a WUR controller 705 that is in communication with a main BB 710 or a similar receiver and multiple WURs 715 (e.g., four WURs 715 in the example shown in FIG. 7, shown as a first WUR 715-1 through a fourth WUR 715-4). The main BB 710 or similar receiver may also be in communication with multiple main radios 720 (e.g., four main radios 720 in the example shown in FIG. 7, shown as a first main radio 720-1 through a fourth main radio 720-4).

In some aspects, the WUR controller 705 may coordinate between the WURs 715 and/or serve as a coordinator and buffer to the main BB 710 and/or main radios 720. More particularly, each WUR 715 may be associated with a corresponding main radio 720. For example, the first WUR 715-1 may be associated with the first main radio 720-1, the second WUR 715-2 may be associated with the second main radio 720-2, the third WUR 715-3 may be associated with the third main radio 720-3, and the fourth WUR 715-4 may be associated with the fourth main radio 720-4. In some aspects, each WUR 715 may be configured to analyze a different beam, and thus multiple quality measurements may be performed in parallel, using reduced resources.

In some aspects, the UE 120 may transmit, and the network node 110 may receive, an indication of a quantity of the multiple WURs 715 that are associated with the UE 120. For example, the UE 120 may transmit, via a capabilities report or similar report, an indication of a quantity of the multiple WURs 715 that are associated with the UE 120 and/or an indication of a number of parallel reception beams that the UE 120 is capable of processing. This signaling may enable the network node 110 to configure WUT and/or WUS repetitions and/or TCI state configurations for the WUT and/or WUS repetitions. Additionally, or alternatively, the network node 110 may transmit, and the UE 120 may receive, an indication of a TCI state associated with each WUT, of the multiple WUTs (e.g., the network node 110 may indicate a TCI state associated with each WUT repetition of a set of periodically transmitted WUTs). For example, based at least in part on the capabilities report or a similar indication regarding a number of parallel WURs at the UE 120, the network node 110 may signal to the UE 120 (e.g., prior to the UE 120 entering a sleep mode) regarding the TCI state per each WUT and/or WUS repetition.

By implementing multiple WURs 715 associated with the WUR controller 705, the WUR controller 705 may be on hold (e.g., may wait to trigger the main BB 710 to wake up to transmit a beam recovery request and/or to receive a downlink communication) until receiving signaling from one or more of the WURs 715 that detected the WUS and/or that measured a quality of a WUT that fell below a quality threshold. For example, when a WUS is detected by one of the WURs 715, the WUR 715 may signal to the WUR controller 705 that the WUS was detected, and the WUR controller 705 may trigger and/or wake up the main BB 710 to receive a downlink communication. The main BB 710 may in turn, activate a main radio 720 to receive the downlink communication. Put another way, the main BB 710 may activate a selected main radio 720, of the multiple main radios 720 associated with the UE 120, to receive a downlink communication based at least in part on the WUS. In some aspects, the main BB 710 may select the selected main radio 720 based at least in part on a physical layer (PHY) indicator estimated based at least in part on the WUS. For example, the main BB 710 may start to work with the best main radio 720, which may be a main radio determined based at least in part on a PHY indicator that may be estimated based at least in part on the WUS (such as via correlation results, or similar results).

In some other aspects, the UE 120 may receive multiple WUTs, with each WUT, of the multiple WUTs, being received using a corresponding WUR 715, of the multiple WURs 715. In such aspects, each WUR 715 may signal corresponding correlation results to the WUR controller 705, and the WUR controller 705 may monitor a best reception beam and/or TCI state based at least in part on the correlation results (e.g., while the main BB 710 and/or main radios 720 remain in a sleep mode). Put another way, the UE 120 (e.g., the WUR controller 705 of the UE 120) may be configured to determine at least one of a best reception beam or a best TCI state based at least in part on the multiple WUTs received by the multiple parallel WURs 715. In this regard, when a main radio 720 is activated (such as in response to detecting a WUS from the network node 110), the main BB 710 may activate a main radio 720 associated with a best reception beam, and/or the UE 120 may indicate, to the network node 110, the best TCI state to enable fast TCI state switching at the network node 110. Aspects of various TCI states that may be associated with each WUT received by the multiple parallel WURs are described in more detail below in connection with FIGS. 8A-8B.

As indicated above, FIG. 7 is provided as an example. Other examples may differ from what is described with respect to FIG. 7.

Figure 8A:
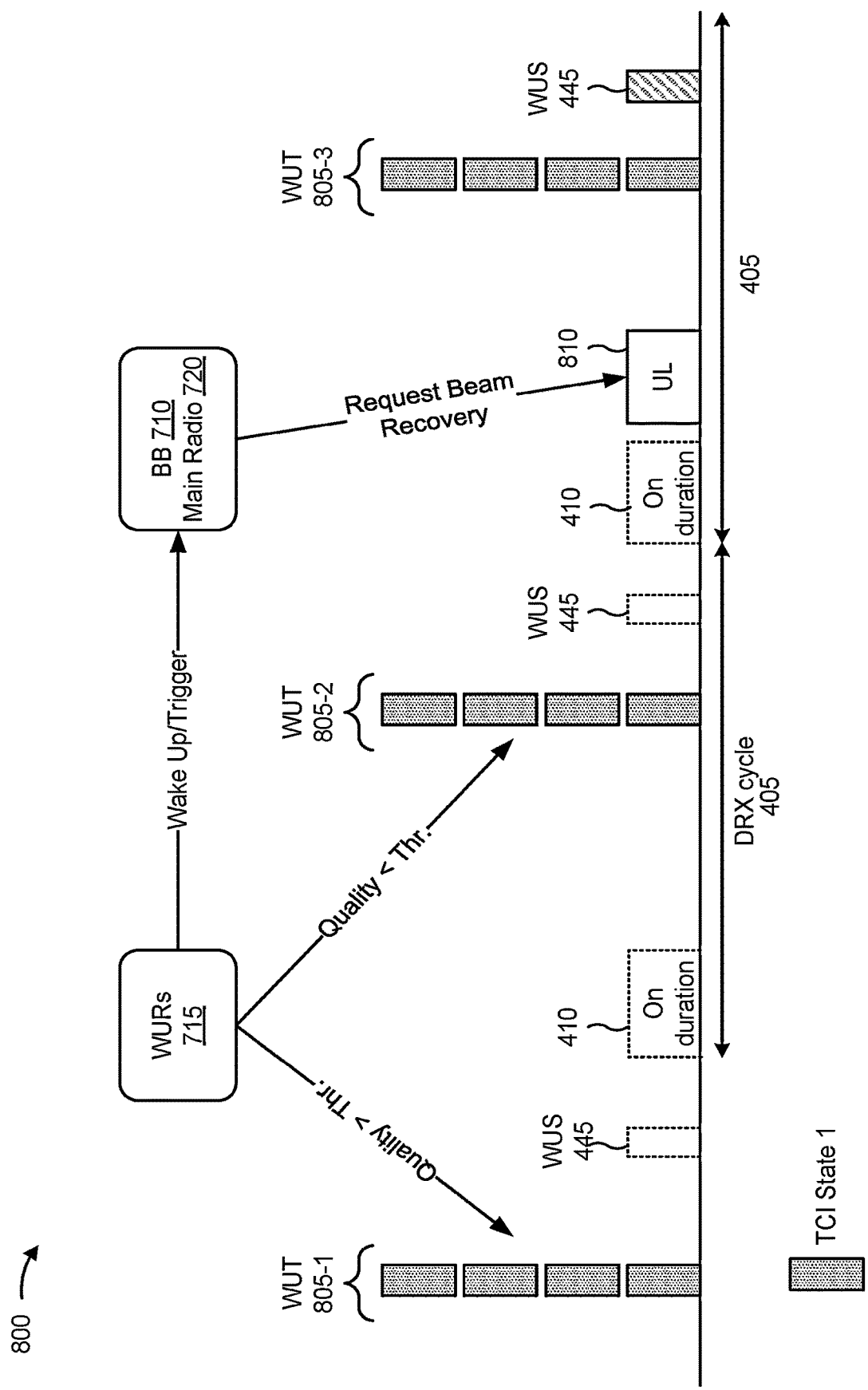
FIGS. 8A-8C are diagrams illustrating other examples associated with parallel WUR reception, in accordance with the present disclosure.
Figure 8B:
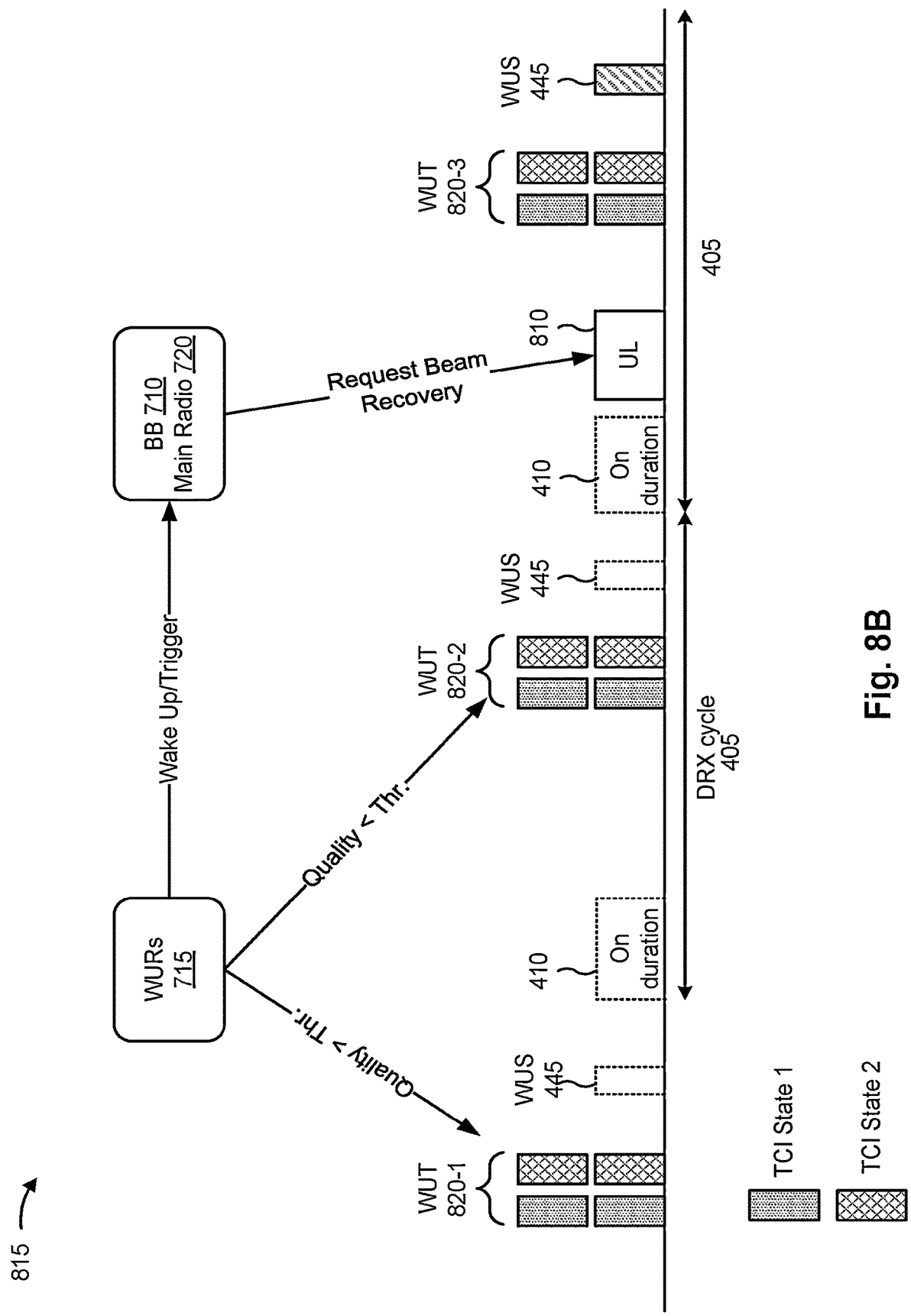
Figure 8C:
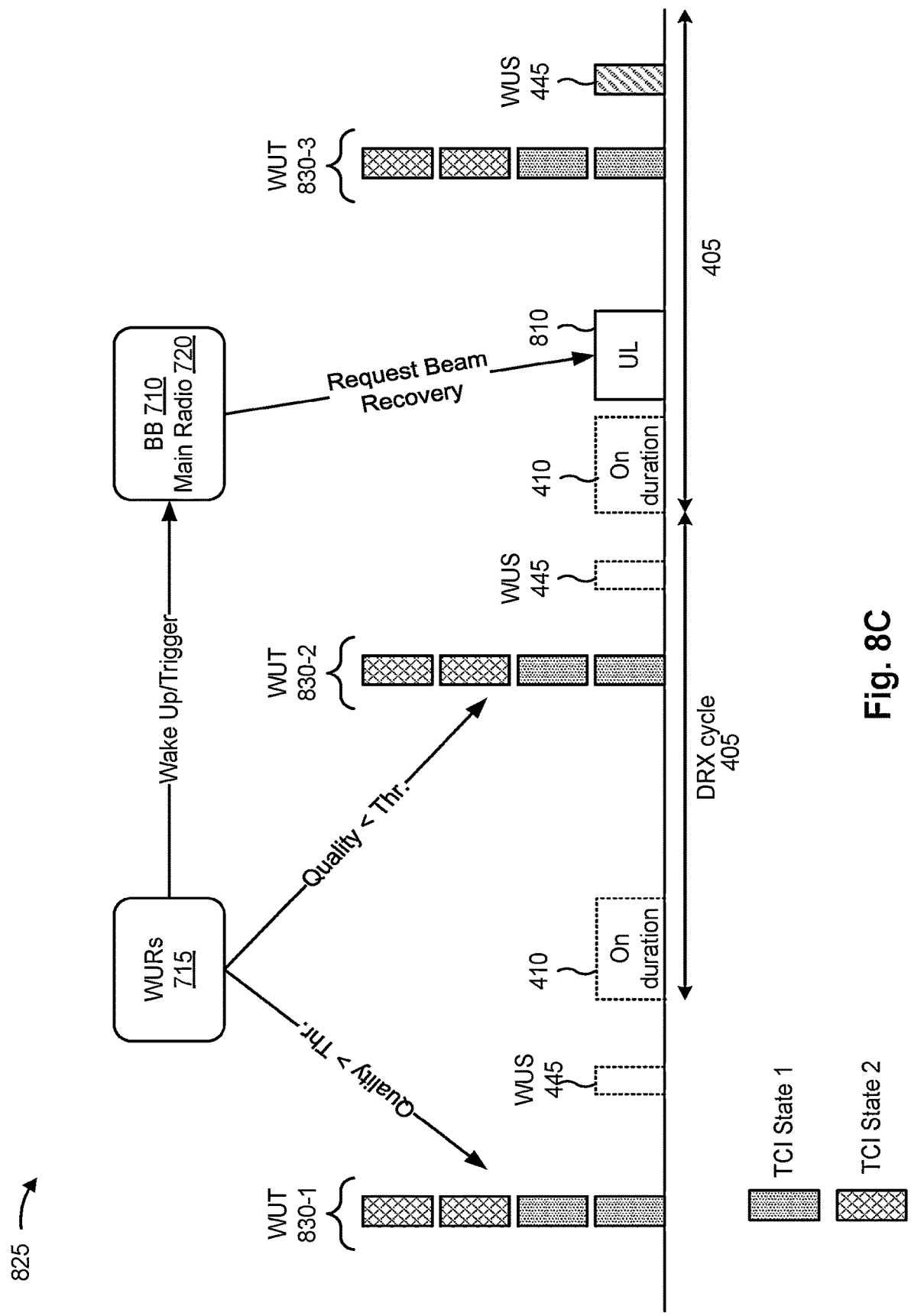

FIGS. 8A-8C are diagrams illustrating other examples associated with parallel WUR reception, in accordance with the present disclosure. The examples shown in FIGS. 8A-8C may be associated with a communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink. In some aspects, the UE 120 may include multiple parallel WURs (e.g., WURs 715), and thus may be configured to receive multiple simultaneously transmitted WUTs, as described above in connection with FIG. 7.

As shown in example 800 shown in FIG. 8A, in some aspects, a UE 120 may be configured to track a single TCI state using multiple (e.g., four in the depicted example) reception beams at the same time. In that regard, a network node 110 may be configured to transmit, and a UE 120 may be configured to receive, a WUT 805 with a configured periodicity. For example, three WUTs 805, shown as WUT 805-1 through 805-3, are shown in FIG. 8A. In this example, the WUT 805 may be associated with a first TCI state, shown as "TCI state 1" in FIG. 8A. The UE 120 may thus implement multiple (e.g., four) WURs 715 in parallel (such as the first WUR 715-1 through fourth WUR 715-4 described above in connection with FIG. 7), with each WUR configured for simultaneous reception of the WUT 805 using a different reception beam (e.g., the first WUR 715-1 may be configured to receive the WUT 805 using a first reception beam, the second WUR 715-2 may be configured to receive the WUT 805 using a second reception beam, the third WUR 715-3 may be configured to receive the WUT 805 using a third reception beam, and the fourth WUR 715-4 may be configured to receive the WUT 805 using a fourth reception beam).

In this regard, network capacity may be increased, as compared to the example 500 described above in connection with FIG. 5, because the WUT 805 may be transmitted using fewer time domain resources. Put another way, the network node does not need to allocate four separate time domain resources for transmitting four repetitions of the WUT 805 in this example, because the UE 120 may receive the WUT 805 using four WURs 715 acting simultaneously. Moreover, in a similar manner as described above in connection with FIGS. 5-7, the UE 120 (more particularly, the WURs 715 of the UE 120) may be configured to track beams using the WUT 805, and thus trigger a main BB 710 and/or main radio 720 to transmit a beam recovery request in a dedicated uplink resource 810 (which may correspond to uplink resource 530) when needed, such as when a measured quality associated with at least one reception beam falls below a threshold. Additionally, or alternatively, the UE 120 (more particularly, the WURs 715 of the UE 120) may be configured to search for a WUS (e.g., WUS 445) and trigger a main BB 710 and/or main radio 720 to wake up and receive a downlink communication if a WUS is detected. In such aspects, the main BB 710 may work with the best main radio 720, which may be decided based at least in part on measured qualities by each WUR 715 associated with the WUT 805 and/or a PHY indicator that may be estimated based at least in part on the WUS (e.g., by using correlation results).

In some other aspects, the network node 110 may transmit WUT repetitions using more than one TCI state, and the UE 120 may be configured to receive the WUT transmissions using one or more reception beams by using multiple WURs 715 in parallel. More particularly, as shown in example 815 depicted in FIG. 8B, a network node 110 may be configured to transmit, and a UE 120 may be configured to receive, multiple WUTs 820 associated with multiple TCI states with a configured periodicity. For example, three sets of WUTs 820, shown as WUTs 820-1 through 820-3, are shown in FIG. 8B. In this example, each set of WUTs 820 may include a first subset of one or more WUTs being associated with a first TCI state (e.g., TCI state 1) and a second subset of one or more WUTs being associated with a second TCI state different from the first TCI state (shown in example 815 as "TCI state 2"). More particularly, in this example, the UE 120 may be configured to track the WUTs 820 using two reception beams at the same time. Accordingly, the network node 110 may transmit a first WUT at a first time resource, with the first WUT being associated with a first TCI state, and the UE 120 may receive the first WUT using two parallel WURs 715 (e.g., using two receive beams). Similarly, the network node 110 may transmit a second WUT at a second time resource, with the second WUT being associated with a second TCI state, and the UE 120 may receive the second WUT using the two parallel WURs 715 (e.g., using two receive beams). In this regard, the UE 120 may be configured to track a double TCI state using two reception beams at the same time, while still increasing network capacity as compared to the aspects described in connection with example 500 of FIG. 5.

In some other aspects, a UE 120 may be configured to receive WUTs associated with more than one TCI state using multiple reception beams simultaneously. More particularly, as shown in example 825 depicted in FIG. 8C, a network node 110 may be configured to transmit, and a UE 120 may be configured to receive, multiple WUTs 830 associated with multiple TCI states with a configured periodicity. For example, three sets of WUTs 830, shown as WUTs 830-1 through 830-3, are shown in FIG. 8C. In this example, each set of WUTs 830 may include a first subset of one or more WUTs being associated with a first TCI state and a second subset of one or more WUTs being associated with a second TCI state different from the first TCI state. In this example, the UE 120 may be configured to track WUTs using four reception beams at the same time. Accordingly, the network node 110 may transmit multiple WUTs simultaneously (e.g., using at least partially overlapping time domain resources). More particularly, the network node 110 may transmit a first WUT at a time resource, with the first WUT being associated with a first TCI state, and the UE 120 may receive the first WUT using two parallel WURs 715 (e.g., using two reception beams). Similarly, the network node 110 may transmit a second WUT at the same time resource, with the second WUT being associated with a second TCI state, and the UE 120 may receive the second WUT using the two other parallel WURs 715 (e.g., using two reception beams).

Put another way, in this example a first two reception beams may be searching for TCI state 1 in a time domain resource associated with the set of WUTs 830, while a second two reception beams may be searching for TCI state 2 in the time domain resource associated with the set of WUTs 830. In some aspects, each TCI state may be distinguishable at the UE 120 according to a unique OOK sequence associated with the corresponding TCI state, which may be signaled by the network node 110 to the UE 120 (e.g., via the configuration information described above in connection with reference number 610). That is, the first subset of WUTs associated with the first TCI state may associated with a first OOK sequence, and the second subset of WUTs associated with the second TCI state may be associated with a second OOK sequence different from the first OOK sequence.

Based at least in part on the UE 120 implementing parallel WURs 715, the UE 120 and/or the network node 110 may conserve computing, power, network, and/or communication resources that may have otherwise been consumed transmitting multiple time-domain repetitions of a WUT. For example, based at least in part on the UE 120 implementing parallel WURs 715, the UE 120 may track one or more TCI states using multiple reception beams at the same time, which may reduce a number of dedicated time domain resources required for transmitting WUTs and thus increase network capacity.

As indicated above, FIGS. 8A-8C are provided as examples. Other examples may differ from what is described with respect to FIGS. 8A-8C.

Figure 9:
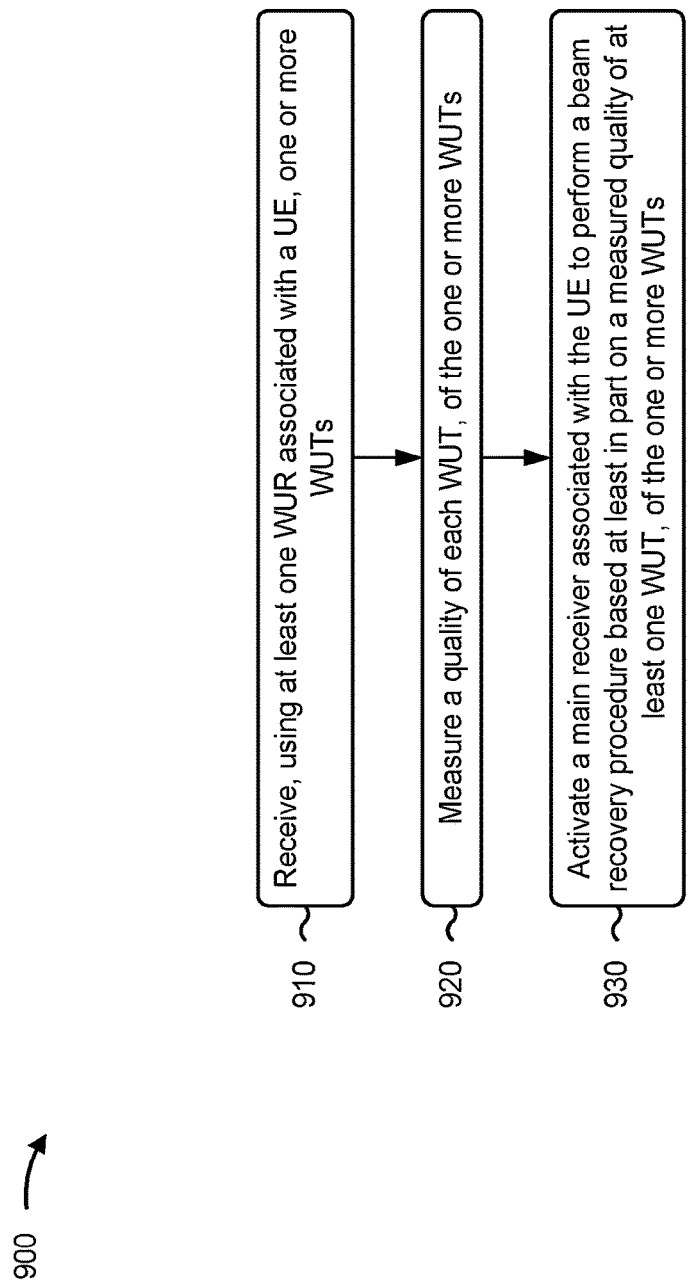
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., UE 120) performs operations associated with receiving a WUT.

As shown in FIG. 9, in some aspects, process 900 may include receiving, using at least one WUR associated with the UE, one or more WUTs (block 910). For example, the UE (e.g., using reception component 1102 and/or communication manager 1106, depicted in FIG. 11) may receive, using at least one WUR associated with the UE, one or more WUTs, as described above.

As further shown in FIG. 9, in some aspects, process 900 may include measuring a quality of each WUT, of the one or more WUTs (block 920). For example, the UE (e.g., using communication manager 1106, depicted in FIG. 11) may measure a quality of each WUT, of the one or more WUTs, as described above.

As further shown in FIG. 9, in some aspects, process 900 may include activating a main receiver associated with the UE to perform a beam recovery procedure based at least in part on a measured quality of at least one WUT, of the one or more WUTs (block 930). For example, the UE (e.g., using communication manager 1106, depicted in FIG. 11) may activate a main receiver associated with the UE to perform a beam recovery procedure based at least in part on a measured quality of at least one WUT, of the one or more WUTs, as described above.

Process 900 may include additional aspects, such as any single aspect or any combination of aspects described below and/or in connection with one or more other processes described elsewhere herein.

In a first aspect, activating the main receiver is further based at least in part on the measured quality of the at least one WUT failing to satisfy a threshold.

In a second aspect, alone or in combination with the first aspect, activating the main receiver is further based at least in part on the measured quality of the at least one WUT failing to satisfy a quality threshold a threshold quantity of times.

In a third aspect, alone or in combination with one or more of the first and second aspects, the one or more WUTs are associated with a first OOK signal.

In a fourth aspect, alone or in combination with one or more of the first through third aspects, process 900 includes receiving a WUS associated with a second OOK signal, wherein a first bit sequence associated with the first OOK signal is different than a second bit sequence associated with the second OOK signal.

In a fifth aspect, alone or in combination with one or more of the first through fourth aspects, the one or more WUTs are associated with multiple beams, the UE receives an indication of a TCI state associated with each beam, of the multiple beams, and measuring the quality of each WUT is associated with at least one of sweeping a reception beam associated with the UE when a same TCI state is associated with two or more beams, or maintaining a constant reception beam associated with the UE when different TCI states are associated with two or more beams.

In a sixth aspect, alone or in combination with one or more of the first through fifth aspects, process 900 includes receiving an indication of information associated with receiving the one or more WUTs.

In a seventh aspect, alone or in combination with one or more of the first through sixth aspects, the information associated with receiving the one or more WUTs includes at least one of resources associated with the one or more WUTs, a sequence index associated with the one or more WUTs, a period associated with the one or more WUTs, an offset associated with the one or more WUTs, a number of occasions associated with the one or more WUTs, a transmission configuration indicator state associated with the one or more WUTs, or a bandwidth associated with the one or more WUTs.

In an eighth aspect, alone or in combination with one or more of the first through seventh aspects, process 900 includes receiving a WUS, wherein the WUS is received in a first CC, and wherein the one or more WUTs are received in a second CC different from the first CC.

In a ninth aspect, alone or in combination with one or more of the first through eighth aspects, the one or more WUTs are periodically received in the second CC.

In a tenth aspect, alone or in combination with one or more of the first through ninth aspects, the WUS includes an indication triggering the UE to receive the one or more WUTs.

In an eleventh aspect, alone or in combination with one or more of the first through tenth aspects, process 900 includes receiving at least one of a DCI or a MAC-CE including an indication triggering the UE to receive the one or more WUTs.

In a twelfth aspect, alone or in combination with one or more of the first through eleventh aspects, process 900 includes transmitting an indication of a requested number of WUT repetitions to be received by the UE.

In a thirteenth aspect, alone or in combination with one or more of the first through twelfth aspects, process 900 includes receiving an indication of an action to take at the UE that is based at least in part on measuring the quality of each WUT, of the one or more WUTs.

In a fourteenth aspect, alone or in combination with one or more of the first through thirteenth aspects, process 900 includes receiving, using the WUR, a WUS, and activating the main receiver associated with the UE to receive a downlink communication based at least in part on receiving the WUS, wherein a reception beam used to receive the downlink communication is associated with a WUT, of the one or more WUTs, associated with a highest quality.

In a fifteenth aspect, alone or in combination with one or more of the first through fourteenth aspects, process 900 includes transmitting an indication of an index associated with the WUT associated with the highest quality.

In a sixteenth aspect, alone or in combination with one or more of the first through fifteenth aspects, process 900 includes receiving, using the WUR, a WUS, wherein the one or more WUTs and the WUS are associated with a same reference signal, and wherein the UE processes the reference signal using parallel correlators.

In a seventeenth aspect, alone or in combination with one or more of the first through sixteenth aspects, process 900 includes receiving multiple WUTs, wherein the UE is associated with multiple WURs, and wherein each WUT, of the multiple WUTs, is received using a corresponding WUR, of the multiple WURs.

In an eighteenth aspect, alone or in combination with one or more of the first through seventeenth aspects, process 900 includes receiving, using at least one WUR, of the multiple WURs, a WUS, and activating a selected main radio, of multiple main radios associated with the UE, to receive a communication based at least in part on the WUS.

In a nineteenth aspect, alone or in combination with one or more of the first through eighteenth aspects, process 900 includes selecting the selected main radio based at least in part on a physical layer indicator estimated based at least in part on the WUS.

In a twentieth aspect, alone or in combination with one or more of the first through nineteenth aspects, process 900 includes determining at least one of a best reception beam or a best transmission configuration indicator state based at least in part on the multiple WUTs.

In a twenty-first aspect, alone or in combination with one or more of the first through twentieth aspects, each WUT, of the multiple WUTs, is associated with a same transmission configuration indicator state.

In a twenty-second aspect, alone or in combination with one or more of the first through twenty-first aspects, a first subset of WUTs, of the multiple WUTs, is associated with a first TCI state, and a second subset of WUTs, of the multiple WUTs, is associated with a second TCI state different from the first TCI state.

In a twenty-third aspect, alone or in combination with one or more of the first through twenty-second aspects, the first subset of WUTs is associated with a first OOK sequence, and the second subset of WUTs is associated with a second OOK sequence different from the first OOK sequence.

In a twenty-fourth aspect, alone or in combination with one or more of the first through twenty-third aspects, process 900 includes transmitting an indication of a quantity of the multiple WURs that are associated with the UE.

In a twenty-fifth aspect, alone or in combination with one or more of the first through twenty-fourth aspects, process 900 includes receiving an indication of a transmission configuration indicator state associated with each WUT, of the multiple WUTs.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
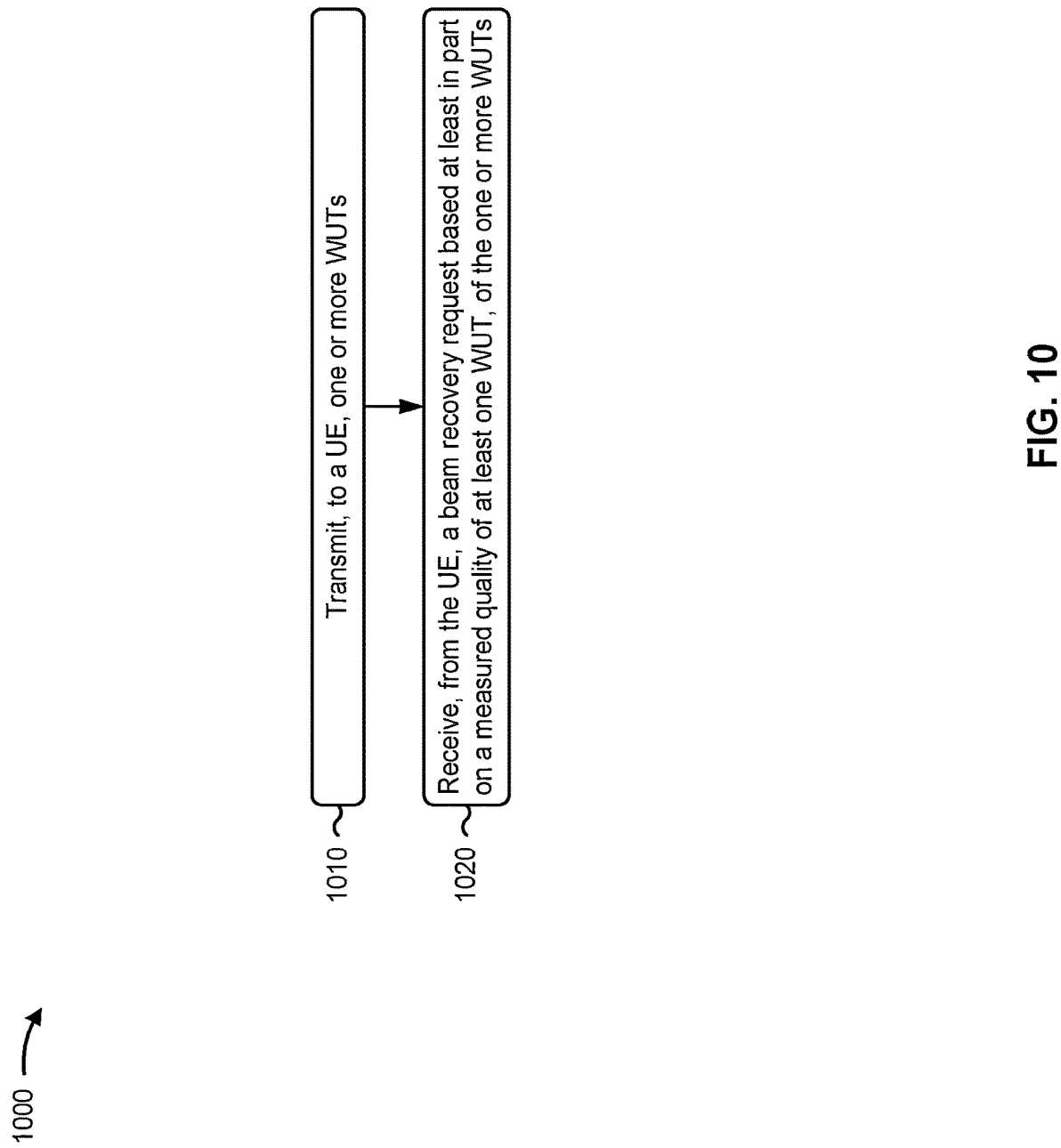
FIG. 10 is a diagram illustrating an example process performed, for example, by a network node, in accordance with the present disclosure.

FIG. 10 is a diagram illustrating an example process 1000 performed, for example, by a network node, in accordance with the present disclosure. Example process 1000 is an example where the network node (e.g., network node 110) performs operations associated with transmitting a WUT.

As shown in FIG. 10, in some aspects, process 1000 may include transmitting, to a UE, one or more WUTs (block 1010). For example, the network node (e.g., using transmission component 1204 and/or communication manager 1206, depicted in FIG. 12) may transmit, to a UE, one or more WUTs, as described above.

As further shown in FIG. 10, in some aspects, process 1000 may include receiving, from the UE, a beam recovery request based at least in part on a measured quality of at least one WUT, of the one or more WUTs (block 1020). For example, the network node (e.g., using reception component 1202 and/or communication manager 1206, depicted in FIG. 12) may receive, from the UE, a beam recovery request based at least in part on a measured quality of at least one WUT, of the one or more WUTs, as described above.

Process 1000 may include additional aspects, such as any single aspect or any combination of aspects described below and/or in connection with one or more other processes described elsewhere herein.

In a first aspect, receiving the beam recovery request is further based at least in part on the measured quality of the at least one WUT failing to satisfy a threshold.

In a second aspect, alone or in combination with the first aspect, receiving the beam recovery request is further based at least in part on the measured quality of the at least one WUT failing to satisfy a quality threshold a threshold quantity of times.

In a third aspect, alone or in combination with one or more of the first and second aspects, the one or more WUTs are associated with a first OOK signal.

In a fourth aspect, alone or in combination with one or more of the first through third aspects, process 1000 includes transmitting, to the UE, a WUS associated with a second OOK signal, wherein a first bit sequence associated with the first OOK signal is different than a second bit sequence associated with the second OOK signal.

In a fifth aspect, alone or in combination with one or more of the first through fourth aspects, the one or more WUTs are associated with multiple beams, the network node transmits, to the UE, an indication of a TCI state associated with each beam, of the multiple beams, and receiving the beam recovery request is associated with the UE performing at least one of sweeping a reception beam associated with the UE when a same TCI state is associated with two or more beams, or maintaining a constant reception beam associated with the UE when different TCI states are associated with two or more beams.

In a sixth aspect, alone or in combination with one or more of the first through fifth aspects, process 1000 includes transmitting, to the UE, an indication of information associated with receiving the one or more WUTs.

In a seventh aspect, alone or in combination with one or more of the first through sixth aspects, the information associated with receiving the one or more WUTs includes at least one of resources associated with the one or more WUTs, a sequence index associated with the one or more WUTs, a period associated with the one or more WUTs, an offset associated with the one or more WUTs, a number of occasions associated with the one or more WUTs, a transmission configuration indicator state associated with the one or more WUTs, or a bandwidth associated with the one or more WUTs.

In an eighth aspect, alone or in combination with one or more of the first through seventh aspects, process 1000 includes transmitting, to the UE, a WUS, wherein the WUS is transmitted in a first CC, and wherein the one or more WUTs are transmitted in a second CC different from the first CC.

In a ninth aspect, alone or in combination with one or more of the first through eighth aspects, the one or more WUTs are periodically transmitted in the second CC.

In a tenth aspect, alone or in combination with one or more of the first through ninth aspects, the WUS includes an indication triggering the UE to receive the one or more WUTs.

In an eleventh aspect, alone or in combination with one or more of the first through tenth aspects, process 1000 includes transmitting at least one of a DCI or a MAC-CE including an indication triggering the UE to receive the one or more WUTs.

In a twelfth aspect, alone or in combination with one or more of the first through eleventh aspects, process 1000 includes receiving, from the UE, an indication of a requested number of WUT repetitions to be received by the UE.

In a thirteenth aspect, alone or in combination with one or more of the first through twelfth aspects, process 1000 includes transmitting, to the UE, an indication of an action to take at the UE that is based at least in part on the UE measuring a quality of each WUT, of the one or more WUTs.

In a fourteenth aspect, alone or in combination with one or more of the first through thirteenth aspects, process 1000 includes receiving, from the UE, an indication of an index associated with a WUT that is associated with a highest quality.

In a fifteenth aspect, alone or in combination with one or more of the first through fourteenth aspects, process 1000 includes transmitting, to the UE, a WUS, wherein the one or more WUTs and the WUS are associated with a same reference signal.

In a sixteenth aspect, alone or in combination with one or more of the first through fifteenth aspects, process 1000 includes transmitting, to the UE, multiple WUTs, wherein the UE is associated with multiple WURs, and wherein each WUT, of the multiple WUTs, is received using a corresponding WUR, of the multiple WURs.

In a seventeenth aspect, alone or in combination with one or more of the first through sixteenth aspects, each WUT, of the multiple WUTs, is associated with a same transmission configuration indicator state.

In an eighteenth aspect, alone or in combination with one or more of the first through seventeenth aspects, a first subset of WUTs, of the multiple WUTs, is associated with a first TCI state, and a second subset of WUTs, of the multiple WUTs, is associated with a second TCI state different from the first TCI state.

In a nineteenth aspect, alone or in combination with one or more of the first through eighteenth aspects, the first subset of WUTs is associated with a first OOK sequence, and the second subset of WUTs is associated with a second OOK sequence different from the first OOK sequence.

In a twentieth aspect, alone or in combination with one or more of the first through nineteenth aspects, process 1000 includes receiving, from the UE, an indication of a quantity of the multiple WURs that are associated with the UE.

In a twenty-first aspect, alone or in combination with one or more of the first through twentieth aspects, process 1000 includes transmitting, to the UE, an indication of a transmission configuration indicator state associated with each WUT, of the multiple WUTs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
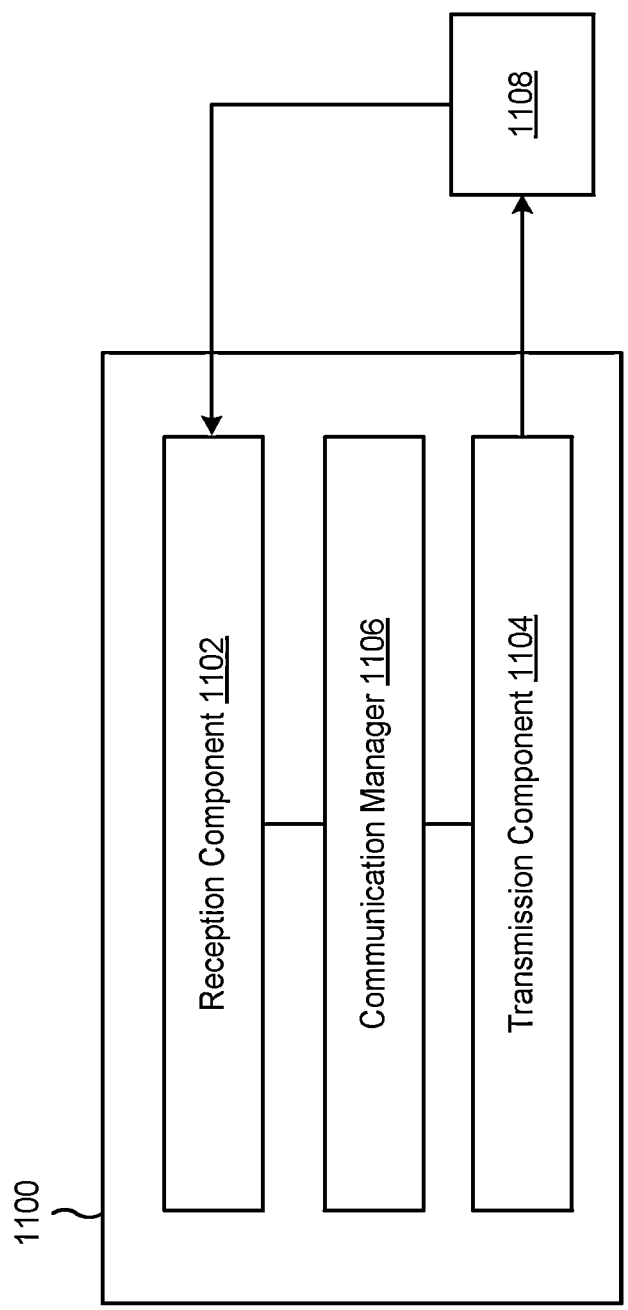
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a UE 120, or a UE 120 may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 140 described in connection with FIG. 1. As shown, the apparatus 1100 may communicate with another apparatus 1108, such as a UE 120 or a network node 110 (such as a CU, a DU, an RU, or a base station), using the reception component 1102 and the transmission component 1104.

In some aspects, the apparatus 1100 may be configured to perform one or more operations described herein in connection with FIGS. 5-8C. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE 120 described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE 120 described in connection with FIG. 2.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, a memory, or a combination thereof, of the UE 120 described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The reception component 1102 may receive, using at least one WUR associated with the UE, one or more WUTs. The communication manager 1106 may measure a quality of each WUT, of the one or more WUTs. The communication manager 1106 may activate a main receiver associated with the UE to perform a beam recovery procedure based at least in part on a measured quality of at least one WUT, of the one or more WUTs.

The reception component 1102 may receive a WUS associated with a second OOK signal, wherein a first bit sequence associated with the first OOK signal is different than a second bit sequence associated with the second OOK signal.

The reception component 1102 may receive an indication of information associated with receiving the one or more WUTs.

The reception component 1102 may receive a WUS, wherein the WUS is received in a first CC, and wherein the one or more WUTs are received in a second CC different from the first CC.

The reception component 1102 may receive at least one of a DCI or a MAC-CE including an indication triggering the UE to receive the one or more WUTs.

The transmission component 1104 may transmit an indication of a requested number of WUT repetitions to be received by the UE.

The reception component 1102 may receive an indication of an action to take at the UE that is based at least in part on measuring the quality of each WUT, of the one or more WUTs.

The reception component 1102 may receive, using the WUR, a WUS.

The communication manager 1106 may activate the main receiver associated with the UE to receive a downlink communication based at least in part on receiving the WUS, wherein a reception beam used to receive the downlink communication is associated with a WUT, of the one or more WUTs, associated with a highest quality.

The transmission component 1104 may transmit an indication of an index associated with the WUT associated with the highest quality.

The reception component 1102 may receive, using the WUR, a WUS, wherein the one or more WUTs and the WUS are associated with a same reference signal, and wherein the UE processes the reference signal using parallel correlators.

The reception component 1102 may receive multiple WUTs, wherein the UE is associated with multiple WURs, and wherein each WUT, of the multiple WUTs, is received using a corresponding WUR, of the multiple WURs.

The reception component 1102 may receive, using at least one WUR, of the multiple WURs, a WUS.

The communication manager 1106 may activate a selected main radio, of multiple main radios associated with the UE, to receive a communication based at least in part on the WUS.

The communication manager 1106 may select the selected main radio based at least in part on a physical layer indicator estimated based at least in part on the WUS.

The communication manager 1106 may determine at least one of a best reception beam or a best transmission configuration indicator state based at least in part on the multiple WUTs.

The transmission component 1104 may transmit an indication of a quantity of the multiple WURs that are associated with the UE.

The reception component 1102 may receive an indication of a transmission configuration indicator state associated with each WUT, of the multiple WUTs.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
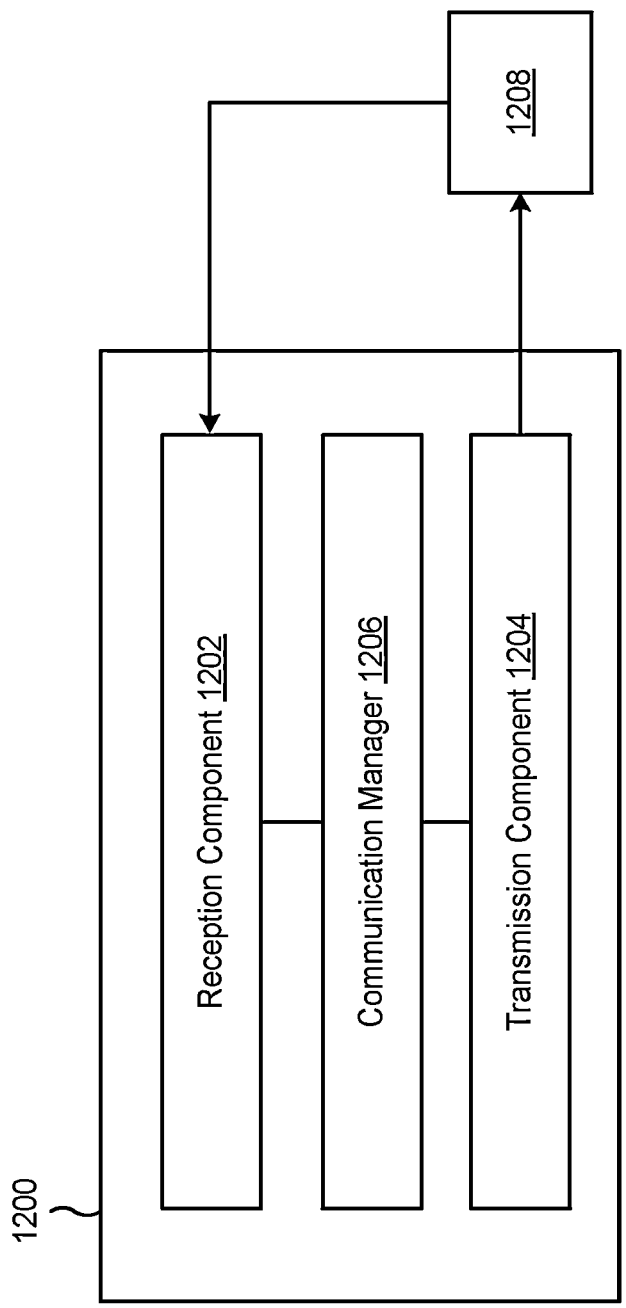
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a network node 110, or a network node 110 may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 150 described in connection with FIG. 1. As shown, the apparatus 1200 may communicate with another apparatus 1208, such as a UE 120 or a network node 110 (such as a CU, a DU, an RU, or a base station), using the reception component 1202 and the transmission component 1204.

In some aspects, the apparatus 1200 may be configured to perform one or more operations described herein in connection with FIGS. 5-8C. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the network node 110 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node 110 described in connection with FIG. 2. In some aspects, the reception component 1202 and/or the transmission component 1204 may include or may be included in a network interface. The network interface may be configured to obtain and/or output signals for the apparatus 1200 via one or more communications links, such as a backhaul link, a midhaul link, and/or a fronthaul link.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the network node 110 described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The transmission component 1204 may transmit, to a UE, one or more WUTs. The reception component 1202 may receive, from the UE, a beam recovery request based at least in part on a measured quality of at least one WUT, of the one or more WUTs.

The transmission component 1204 may transmit, to the UE, a WUS associated with a second OOK signal, wherein a first bit sequence associated with the first OOK signal is different than a second bit sequence associated with the second OOK signal.

The transmission component 1204 may transmit, to the UE, an indication of information associated with receiving the one or more WUTs.

The transmission component 1204 may transmit, to the UE, a WUS, wherein the WUS is transmitted in a first CC, and wherein the one or more WUTs are transmitted in a second CC different from the first CC.

The transmission component 1204 may transmit at least one of a DCI or a MAC-CE including an indication triggering the UE to receive the one or more WUTs.

The reception component 1202 may receive, from the UE, an indication of a requested number of WUT repetitions to be received by the UE.

The transmission component 1204 may transmit, to the UE, an indication of an action to take at the UE that is based at least in part on the UE measuring a quality of each WUT, of the one or more WUTs.

The reception component 1202 may receive, from the UE, an indication of an index associated with a WUT that is associated with a highest quality.

The transmission component 1204 may transmit, to the UE, a WUS, wherein the one or more WUTs and the WUS are associated with a same reference signal.

The transmission component 1204 may transmit, to the UE, multiple WUTs, wherein the UE is associated with multiple WURs, and wherein each WUT, of the multiple WUTs, is received using a corresponding WUR, of the multiple WURs.

The reception component 1202 may receive, from the UE, an indication of a quantity of the multiple WURs that are associated with the UE.

The transmission component 1204 may transmit, to the UE, an indication of a transmission configuration indicator state associated with each WUT, of the multiple WUTs.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving, using at least one WUR associated with the UE, one or more WUTs; measuring a quality of each WUT, of the one or more WUTs; and activating a main receiver associated with the UE to perform a beam recovery procedure based at least in part on a measured quality of at least one WUT, of the one or more WUTs.

Aspect 2: The method of Aspect 1, wherein activating the main receiver is further based at least in part on the measured quality of the at least one WUT failing to satisfy a threshold.

Aspect 3: The method of any of Aspects 1-2, wherein activating the main receiver is further based at least in part on the measured quality of the at least one WUT failing to satisfy a quality threshold a threshold quantity of times.

Aspect 4: The method of any of Aspects 1-3, wherein the one or more WUTs are associated with a first OOK signal.

Aspect 5: The method of Aspect 4, further comprising receiving a WUS associated with a second OOK signal, wherein a first bit sequence associated with the first OOK signal is different than a second bit sequence associated with the second OOK signal.

Aspect 6: The method of any of Aspects 1-5, wherein the one or more WUTs are associated with multiple beams, wherein the UE receives an indication of a TCI state associated with each beam, of the multiple beams, and wherein measuring the quality of each WUT is associated with at least one of: sweeping a reception beam associated with the UE when a same TCI state is associated with two or more beams, or maintaining a constant reception beam associated with the UE when different TCI states are associated with two or more beams.

Aspect 7: The method of any of Aspects 1-6, further comprising receiving an indication of information associated with receiving the one or more WUTs.

Aspect 8: The method of Aspect 7, wherein the information associated with receiving the one or more WUTs includes at least one of: resources associated with the one or more WUTs, a sequence index associated with the one or more WUTs, a period associated with the one or more WUTs, an offset associated with the one or more WUTs, a number of occasions associated with the one or more WUTs, a transmission configuration indicator state associated with the one or more WUTs, or a bandwidth associated with the one or more WUTs.

Aspect 9: The method of any of Aspects 1-8, further comprising receiving a WUS, wherein the WUS is received in a first CC, and wherein the one or more WUTs are received in a second CC different from the first CC.

Aspect 10: The method of Aspect 9, wherein the one or more WUTs are periodically received in the second CC.

Aspect 11: The method of Aspect 9, wherein the WUS includes an indication triggering the UE to receive the one or more WUTs.

Aspect 12: The method of Aspect 9, further comprising receiving at least one of a DCI or a MAC-CE including an indication triggering the UE to receive the one or more WUTs.

Aspect 13: The method of any of Aspects 1-12, further comprising transmitting an indication of a requested number of WUT repetitions to be received by the UE.

Aspect 14: The method of any of Aspects 1-13, further comprising receiving an indication of an action to take at the UE that is based at least in part on measuring the quality of each WUT, of the one or more WUTs.

Aspect 15: The method of any of Aspects 1-14, further comprising: receiving, using the WUR, a WUS; and activating the main receiver associated with the UE to receive a downlink communication based at least in part on receiving the WUS, wherein a reception beam used to receive the downlink communication is associated with a WUT, of the one or more WUTs, associated with a highest quality.

Aspect 16: The method of Aspect 15, further comprising transmitting an indication of an index associated with the WUT associated with the highest quality.

Aspect 17: The method of any of Aspects 1-16, further comprising receiving, using the WUR, a WUS, wherein the one or more WUTs and the WUS are associated with a same reference signal, and wherein the UE processes the reference signal using parallel correlators.

Aspect 18: The method of any of Aspects 1-17, further comprising receiving multiple WUTs, wherein the UE is associated with multiple WURs, and wherein each WUT, of the multiple WUTs, is received using a corresponding WUR, of the multiple WURs.

Aspect 19: The method of Aspect 18, further comprising: receiving, using at least one WUR, of the multiple WURs, a WUS; and activating a selected main radio, of multiple main radios associated with the UE, to receive a communication based at least in part on the WUS.

Aspect 20: The method of Aspect 19, further comprising selecting the selected main radio based at least in part on a physical layer indicator estimated based at least in part on the WUS.

Aspect 21: The method of Aspect 18, further comprising determining at least one of a best reception beam or a best transmission configuration indicator state based at least in part on the multiple WUTs.

Aspect 22: The method of Aspect 18, wherein each WUT, of the multiple WUTs, is associated with a same transmission configuration indicator state.

Aspect 23: The method of Aspect 18, wherein a first subset of WUTs, of the multiple WUTs, is associated with a first TCI state, and wherein a second subset of WUTs, of the multiple WUTs, is associated with a second TCI state different from the first TCI state.

Aspect 24: The method of Aspect 23, wherein the first subset of WUTs is associated with a first OOK sequence, and wherein the second subset of WUTs is associated with a second OOK sequence different from the first OOK sequence.

Aspect 25: The method of Aspect 18, further comprising transmitting an indication of a quantity of the multiple WURs that are associated with the UE.

Aspect 26: The method of Aspect 25, further comprising receiving an indication of a transmission configuration indicator state associated with each WUT, of the multiple WUTs.

Aspect 27: A method of wireless communication performed by a network node, comprising: transmitting, to a UE, one or more WUTs; and receiving, from the UE, a beam recovery request based at least in part on a measured quality of at least one WUT, of the one or more WUTs.

Aspect 28: The method of Aspect 27, wherein receiving the beam recovery request is further based at least in part on the measured quality of the at least one WUT failing to satisfy a threshold.

Aspect 29: The method of any of Aspects 27-28, wherein receiving the beam recovery request is further based at least in part on the measured quality of the at least one WUT failing to satisfy a quality threshold a threshold quantity of times.

Aspect 30: The method of any of Aspects 27-29, wherein the one or more WUTs are associated with a first OOK signal.

Aspect 31: The method of Aspect 30, further comprising transmitting, to the UE, a WUS associated with a second OOK signal, wherein a first bit sequence associated with the first OOK signal is different than a second bit sequence associated with the second OOK signal.

Aspect 32: The method of any of Aspects 27-31, wherein the one or more WUTs are associated with multiple beams, wherein the network node transmits, to the UE, an indication of a TCI state associated with each beam, of the multiple beams, and wherein receiving the beam recovery request is associated with the UE performing at least one of: sweeping a reception beam associated with the UE when a same TCI state is associated with two or more beams, or maintaining a constant reception beam associated with the UE when different TCI states are associated with two or more beams.

Aspect 33: The method of any of Aspects 27-32, further comprising transmitting, to the UE, an indication of information associated with receiving the one or more WUTs.

Aspect 34: The method of Aspect 33, wherein the information associated with receiving the one or more WUTs includes at least one of: resources associated with the one or more WUTs, a sequence index associated with the one or more WUTs, a period associated with the one or more WUTs, an offset associated with the one or more WUTs, a number of occasions associated with the one or more WUTs, a transmission configuration indicator state associated with the one or more WUTs, or a bandwidth associated with the one or more WUTs.

Aspect 35: The method of any of Aspects 27-34, further comprising transmitting, to the UE, a WUS, wherein the WUS is transmitted in a first CC, and wherein the one or more WUTs are transmitted in a second CC different from the first CC.

Aspect 36: The method of Aspect 35, wherein the one or more WUTs are periodically transmitted in the second CC.

Aspect 37: The method of Aspect 35, wherein the WUS includes an indication triggering the UE to receive the one or more WUTs.

Aspect 38: The method of Aspect 35, further comprising transmitting at least one of a DCI or a MAC-CE including an indication triggering the UE to receive the one or more WUTs.

Aspect 39: The method of any of Aspects 27-38, further comprising receiving, from the UE, an indication of a requested number of WUT repetitions to be received by the UE.

Aspect 40: The method of any of Aspects 27-39, further comprising transmitting, to the UE, an indication of an action to take at the UE that is based at least in part on the UE measuring a quality of each WUT, of the one or more WUTs.

Aspect 41: The method of any of Aspects 27-40, further comprising receiving, from the UE, an indication of an index associated with a WUT that is associated with a highest quality.

Aspect 42: The method of any of Aspects 27-41, further comprising transmitting, to the UE, a WUS, wherein the one or more WUTs and the WUS are associated with a same reference signal.

Aspect 43: The method of any of Aspects 27-42, further comprising transmitting, to the UE, multiple WUTs, wherein the UE is associated with multiple WURs, and wherein each WUT, of the multiple WUTs, is received using a corresponding WUR, of the multiple WURs.

Aspect 44: The method of Aspect 43, wherein each WUT, of the multiple WUTs, is associated with a same transmission configuration indicator state.

Aspect 45: The method of Aspect 43, wherein a first subset of WUTs, of the multiple WUTs, is associated with a first TCI state, and wherein a second subset of WUTs, of the multiple WUTs, is associated with a second TCI state different from the first TCI state.

Aspect 46: The method of Aspect 45, wherein the first subset of WUTs is associated with a first OOK sequence, and wherein the second subset of WUTs is associated with a second OOK sequence different from the first OOK sequence.

Aspect 47: The method of Aspect 43, further comprising receiving, from the UE, an indication of a quantity of the multiple WURs that are associated with the UE.

Aspect 48: The method of Aspect 43, further comprising transmitting, to the UE, an indication of a transmission configuration indicator state associated with each WUT, of the multiple WUTs.

Aspect 49: An apparatus for wireless communication at a device, comprising a processor; memory coupled with the processor; and instructions stored in the memory and executable by the processor to cause the apparatus to perform the method of one or more of Aspects 1-48.

Aspect 50: A device for wireless communication, comprising a memory and one or more processors coupled to the memory, the one or more processors configured to perform the method of one or more of Aspects 1-48.

Aspect 51: An apparatus for wireless communication, comprising at least one means for performing the method of one or more of Aspects 1-48.

Aspect 52: A non-transitory computer-readable medium storing code for wireless communication, the code comprising instructions executable by a processor to perform the method of one or more of Aspects 1-48.

Aspect 53: A non-transitory computer-readable medium storing a set of instructions for wireless communication, the set of instructions comprising one or more instructions that, when executed by one or more processors of a device, cause the device to perform the method of one or more of Aspects 1-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   a memory; and
   one or more processors, coupled to the memory, configured to:
      receive, using at least one wake up receiver (WUR) associated with the UE, one or more wake up signals for beam tracking (WUTs),
         wherein the one or more WUTs are associated with a first on-off keying (OOK) signal having a first bit sequence that is different than a second bit sequence of a second OOK signal associated with a wake up signal (WUS);
      measure a quality of each WUT, of the one or more WUTs; and
      activate a main receiver associated with the UE to perform a beam recovery procedure based at least in part on a measured quality of at least one WUT, of the one or more WUTs.

2. The UE of claim 1, wherein the one or more processors are further configured to activate the main receiver based at least in part on the measured quality of the at least one WUT failing to satisfy a threshold.

3. The UE of claim 1, wherein the one or more processors are further configured to activate the main receiver based at least in part on the measured quality of the at least one WUT failing to satisfy a quality threshold a threshold quantity of times.

4. The UE of claim 1, wherein the one or more WUTs are associated with multiple beams, wherein the one or more processors are further configured to receive an indication of a transmission configuration indicator (TCI) state associated with each beam, of the multiple beams, and wherein the one or more processors are further configured to measure the quality of each WUT based at least in part at least one of:
   sweeping a reception beam associated with the UE when a same TCI state is associated with two or more beams, or
   maintaining a constant reception beam associated with the UE when different TCI states are associated with two or more beams.

5. The UE of claim 1, wherein the one or more processors are further configured to receive an indication of information associated with receiving the one or more WUTs.

6. The UE of claim 5, wherein the information associated with receiving the one or more WUTs includes at least one of:
   resources associated with the one or more WUTs,
   a sequence index associated with the one or more WUTs,
   a period associated with the one or more WUTs,
   an offset associated with the one or more WUTs,
   a number of occasions associated with the one or more WUTs,
   a transmission configuration indicator state associated with the one or more WUTs, or
   a bandwidth associated with the one or more WUTs.

7. The UE of claim 1, wherein the WUS is associated with a first component carrier (CC), and wherein the one or more WUTs are associated with a second CC different from the first CC.

8. The UE of claim 7, wherein the one or more processors are further configured to periodically receive the one or more WUTs in the second CC.

9. The UE of claim 7, wherein the WUS includes an indication triggering the UE to receive the one or more WUTs.

10. The UE of claim 7, wherein the one or more processors are further configured to receive at least one of a downlink control information (DCI) or a medium access control (MAC) control element (MAC-CE) including an indication triggering the UE to receive the one or more WUTs.

11. The UE of claim 1, wherein the one or more processors are further configured to transmit an indication of a requested number of WUT repetitions to be received by the UE.

12. The UE of claim 1, wherein the one or more processors are further configured to receive an indication of an action to take at the UE that is based at least in part on measuring the quality of each WUT, of the one or more WUTs.

13. The UE of claim 1, wherein the one or more processors are further configured to:
receive, using the WUR, the WUS; and
activate the main receiver associated with the UE to receive a downlink communication based at least in part on receiving the WUS, wherein a reception beam used to receive the downlink communication is associated with a WUT, of the one or more WUTs, associated with a highest quality.

14. The UE of claim 13, wherein the one or more processors are further configured to transmit an indication of an index associated with the WUT associated with the highest quality.

15. The UE of claim 1, wherein the one or more processors are further configured to receive, using the WUR, the WUS, wherein the one or more WUTs and the WUS are associated with a same reference signal, and wherein the one or more processors are further configured to process the same reference signal using parallel correlators.

16. The UE of claim 1, wherein the one or more processors are further configured to receive multiple WUTs, wherein the UE is associated with multiple WURs, and wherein the one or more processors are further configured to receive each WUT, of the multiple WUTs, using a corresponding WUR, of the multiple WURs.

17. The UE of claim 16, wherein the one or more processors are further configured to:
receive, using at least one WUR, of the multiple WURs, the WUS; and
activate a selected main radio, of multiple main radios associated with the UE, to receive a communication based at least in part on the WUS.

18. The UE of claim 17, wherein the one or more processors are further configured to select the selected main radio based at least in part on a physical layer indicator estimated based at least in part on the WUS.

19. The UE of claim 16, wherein the one or more processors are further configured to determine at least one of a best reception beam or a best transmission configuration indicator state based at least in part on the multiple WUTs.

20. The UE of claim 16, wherein each WUT, of the multiple WUTs, is associated with a same transmission configuration indicator state.

21. The UE of claim 16, wherein a first subset of WUTs, of the multiple WUTs, is associated with a first transmission configuration indicator (TCI) state, and wherein a second subset of WUTs, of the multiple WUTs, is associated with a second TCI state different from the first TCI state.

22. The UE of claim 21, wherein the first subset of WUTs is associated with a first OOK sequence, and wherein the second subset of WUTs is associated with a second OOK sequence different from the first OOK sequence.

23. The UE of claim 16, wherein the one or more processors are further configured to transmit an indication of a quantity of the multiple WURs that are associated with the UE.

24. The UE of claim 23, wherein the one or more processors are further configured to receive an indication of a transmission configuration indicator state associated with each WUT, of the multiple WUTs.

25. A network node for wireless communication, comprising:
a memory; and
one or more processors, coupled to the memory, configured to:
transmit, to a user equipment (UE), one or more wake up signals for beam tracking (WUTs),
wherein the one or more WUTs are associated with a first on-off keying (OOK) signal having a first bit sequence that is different than a second bit sequence of a second OOK signal associated with a wake up signal (WUS); and
receive, from the UE, a beam recovery request based at least in part on a measured quality of at least one WUT, of the one or more WUTs.

26. The network node of claim 25, wherein the one or more WUTs are associated with multiple beams, wherein the one or more processors are further configured to transmit, to the UE, an indication of a transmission configuration indicator (TCI) state associated with each beam, of the multiple beams, and wherein the one or more processors are further configured to receive the beam recovery request based at least in part on at least one of:
the UE sweeping a reception beam associated with the UE when a same TCI state is associated with two or more beams, or
the UE maintaining a constant reception beam associated with the UE when different TCI states are associated with two or more beams.

27. A method of wireless communication performed by a user equipment (UE), comprising:
receiving, using at least one wake up receiver (WUR) associated with the UE, one or more wake up signals for beam tracking (WUTs),
wherein the one or more WUTs are associated with a first on-off keying (OOK) signal having a first bit sequence that is different than a second bit sequence of a second OOK signal associated with a wake up signal (WUS);
measuring a quality of each WUT, of the one or more WUTs; and
activating a main receiver associated with the UE to perform a beam recovery procedure based at least in part on a measured quality of at least one WUT, of the one or more WUTs.

28. A method of wireless communication performed by a network node, comprising:
transmitting, to a user equipment (UE), one or more wake up signals for beam tracking (WUTs),
wherein the one or more WUTs are associated with a first on-off keying (OOK) signal having a first bit sequence that is different than a second bit sequence of a second OOK signal associated with a wake up signal (WUS); and
receiving, from the UE, a beam recovery request based at least in part on a measured quality of at least one WUT, of the one or more WUTs.

29. The method of claim 28, wherein the one or more WUTs are associated with multiple beams, wherein the method further comprises:
transmitting, to the UE, an indication of a transmission configuration indicator (TCI) state associated with each beam, of the multiple beams; and
receiving the beam recovery request based at least in part on at least one of:
the UE sweeping a reception beam associated with the UE when a same TCI state is associated with two or more beams, or the UE maintaining a constant reception beam associated with the UE when different TCI states are associated with two or more beams.

30. The method of claim 27, further comprising:

activating the main receiver based at least in part on the measured quality of the at least one WUT failing to satisfy a threshold.

* * * * *